United States Patent
Ellervik et al.

(10) Patent No.: US 12,496,288 B2
(45) Date of Patent: Dec. 16, 2025

(54) VAGINAL TABLET FORMULATION

(71) Applicant: Gedea Biotech AB, Lund (SE)

(72) Inventors: Ulf Ellervik, Löddeköpinge (SE); Sophie Manner, Helsingborg (SE); Olov Sterner, Malmö (SE); Helena Strevens, Lund (SE); Nils-Olof Lindberg, Limhamn (SE); Annette Säfholm, Lund (SE)

(73) Assignee: Gedea Biotech AB, Lund (SE)

( * ) Notice: Subject to any disclaimer, the term of this patent is extended or adjusted under 35 U.S.C. 154(b) by 571 days.

(21) Appl. No.: 17/601,521

(22) PCT Filed: Apr. 3, 2020

(86) PCT No.: PCT/EP2020/059582
§ 371 (c)(1),
(2) Date: Oct. 5, 2021

(87) PCT Pub. No.: WO2020/201515
PCT Pub. Date: Oct. 8, 2020

(65) Prior Publication Data
US 2022/0193031 A1    Jun. 23, 2022

(30) Foreign Application Priority Data
Apr. 5, 2019  (EP) ..................... 19167495

(51) Int. Cl.
*A61K 31/366*   (2006.01)
*A61K 9/00*   (2006.01)
(Continued)

(52) U.S. Cl.
CPC .......... *A61K 31/366* (2013.01); *A61K 9/0034* (2013.01); *A61K 9/2054* (2013.01);
(Continued)

(58) Field of Classification Search
CPC .. A61K 9/2059; A61K 9/2054; A61K 31/365; A61K 31/366; A61K 9/0034; A61P 31/10; A61P 31/04
See application file for complete search history.

(56) References Cited

U.S. PATENT DOCUMENTS 5,049,568 A  *  9/1991  Kristof ................... A61K 47/26
                                                       514/317
6,287,599 B1 *  9/2001  Burnside ................. A61P 35/02
                                                       424/468
(Continued)

FOREIGN PATENT DOCUMENTS

EP     0956858 A1   11/1999
JP     H07173077    7/1995
(Continued)

OTHER PUBLICATIONS

Hydroxypropyl methylcellulose (Hypromellose), 100 mPa.s USP Substitution Type 2208: https://pr.vwr.com/store/product/21573014/null (Year: 2024).*
(Continued)

*Primary Examiner* — Hong Yu
(74) *Attorney, Agent, or Firm* — Weston R. Gould; Dinsmore & Shohl LLP

(57) ABSTRACT

The present invention concerns a pharmaceutical composition comprising glucono-δ-lactone, which is suitable for use in the treatment of vaginal microbial infections.

14 Claims, 2 Drawing Sheets

(51) Int. Cl.
*A61K 9/20* (2006.01)
*A61P 31/04* (2006.01)
*A61P 31/10* (2006.01)

(52) U.S. Cl.
CPC ............ *A61K 9/2059* (2013.01); *A61P 31/04* (2018.01); *A61P 31/10* (2018.01)

(56) References Cited

U.S. PATENT DOCUMENTS

| | | | |
|---|---|---|---|
| 2005/0175694 A1* | 8/2005 | Sen | A61P 31/18 424/468 |
| 2006/0020040 A1* | 1/2006 | Chawla | A61K 9/2013 514/649 |
| 2013/0028971 A1 | 1/2013 | Viscomi et al. | |

FOREIGN PATENT DOCUMENTS

| | | |
|---|---|---|
| JP | 2004-500317 A | 1/2004 |
| JP | 2009-541419 A | 11/2009 |
| WO | 2002/087570 A1 | 11/2002 |
| WO | 2017/174731 A1 | 10/2017 |

OTHER PUBLICATIONS

Lampe, et al., Susceptibility of Chlamydia trachomastisto Chlorhexidine Gluconate Gel, Antimicobial Agents and Chemotherapy, 42(7): 1726-1730, Jul. 1998.

"Supplement for Inflammatory Rheumatic Joint Disorders"; Company: Verla-Pharm; Brand: Veria ArthriVerlan; Published Jan. 2013 on MINTEL GNPD <URL:https://www.gnpd.com/sinatra/recordpage/1955481/>, Last Retrieved Oct. 28, 2024.

* cited by examiner

VAGINAL TABLET FORMULATION

TECHNICAL FIELD

The present invention relates to a pharmaceutical composition suitable for use in the treatment of vaginal microbial infections.

BACKGROUND

The vaginal microbiome is a dynamic system with a complex mixture of various microorganisms in different ratios and quantities, which depends upon lactic acid producing bacteria to maintain a weakly acidic environment (typically pH 3.5 to 4.5).

Any sudden change in the vaginal micro-flora will increase the vaginal pH and consequently create a more favorable environment for the establishment of vaginal pathogens, which grow optimally at pH over 5. The imbalance in the flora of microorganisms in the vagina can thus lead to vaginal infections, a condition that affects a large percentage of women of reproductive age each year.

Treatments of vaginal infections include vaginal capsules, tablets and creams such as econazol, clomitrazol, miconazole, tioconazole, butoconazol and fluconazole. However, many of the treatments currently on the market accompanied a high recurrence of the infection, and in addition have various side effects, including stomach upset, headache and rashes. Some of the treatments cannot be used during gestation due to the potential risk of harm to the fetus. Furthermore, a resistance to the drug may develop as the infectious organisms the antimicrobial agent is designed to kill adapt to them. In addition, many of the treatments are pharmaceutical fat based pessaries, which are not stable at elevated temperatures.

One target for antimicrobial agents is biofilms, which are formed by microbial cells stuck to each other and surrounded by the self-produced extracellular polymeric matrix. It has been shown that gluconic acid (CAS 526-95-4) reduces the presence of biofilm of different *Candida* species as well as several strains of bacteria [WO 2017/174731, WO 2019/068862]. Gluconic acid is difficult to produce as a solid crystalline product and is usually supplied as a 50% water solution. Whereas such a water solution may be used to provide a liquid pharmaceutical formulation for vaginal administration, such as a vaginal cream, a vaginal gel, the water solution is less suitable for use in providing a solid pharmaceutical formulation for vaginal administration, such as a vaginal tablet, a vaginal suppository, or a vaginal ring.

The need for the treatment of a vaginal infection may occur at home, during work, or on travel, and the product should therefore be able to be shaken, clamped, subjected to moderate bumping, and be insensitive to changes in temperature. Preferably, the product has a shelf life of at least 6 months, or more preferably of at least 1 year. The product should be easy to apply with or without an applicator. If the product is applied without an applicator, it should be stable to hold, it should not be slippery or shiny.

Contact with fingers should not change the characteristics of the product. Furthermore, the product should swell up to the right fit and stay in its position, but not scratch. The product should not slide down. Furthermore, the product should have an optimal release time for the treatment of the infection. During treatment, the product should not be perceived as sticky or that product residues slides out. The product should not discolor textiles or cause fatty stains. The treatment should preferably be odorless and not prevent the user from daily activities such as work, sports and the like.

In summary, current treatment regimens and prevention strategies for infections in the genital area have many limitations, and there is a need for novel, treatment-and-prevention alternatives, which are safe during pregnancy and with low risk of resistance development.

SUMMARY

Gluconic acid is known to reduce the presence of biofilm. However, gluconic acid is difficult to produce as a solid crystalline product and is thus less suitable for use in providing a solid pharmaceutical formulation for vaginal administration, such as a vaginal tablet, a vaginal suppository, or a vaginal ring. In water solution, gluconic acid is in equilibrium with the glucono-γ-lactone and the glucono-δ-lactone (GDL; CAS 90-8-2). The present inventors have found that GDL as such has an effect on the formation of biofilm of different *Candida* species as well as bacteria, implicating that GDL in itself acts as an active compound. GDL is a solid at room temperature and body temperature and is therefore suitable to use as the active ingredient in e.g. a vaginal tablet, a pessary, a vaginal disc or suppository or a vagitory. The present inventors have developed a solid pharmaceutical formulation comprising GDL, which is suitable for use in the treatment of vaginal microbial infections.

In one aspect, the present invention relates to a pharmaceutical composition comprising glucono-b-lactone (GDL) and hypromellose (HPMC). In a further aspect, the present invention relates to a solid pharmaceutical composition suitable for vaginal administration, said pharmaceutical composition comprising 5 to 30 wt % Glucono-5-lactone (GDL); and 10 to 40 wt % Hypromellose (HPMC).

In another aspect, the present invention concerns the use of a pharmaceutical composition as defined herein as a medicament, such as in the treatment of microbial infections. In one embodiment, said microbial infections are vaginal microbial infections.

In yet another aspect, the present invention relates to a method for manufacturing a pharmaceutical composition as defined herein.

DETAILED DESCRIPTION

Figure 1:
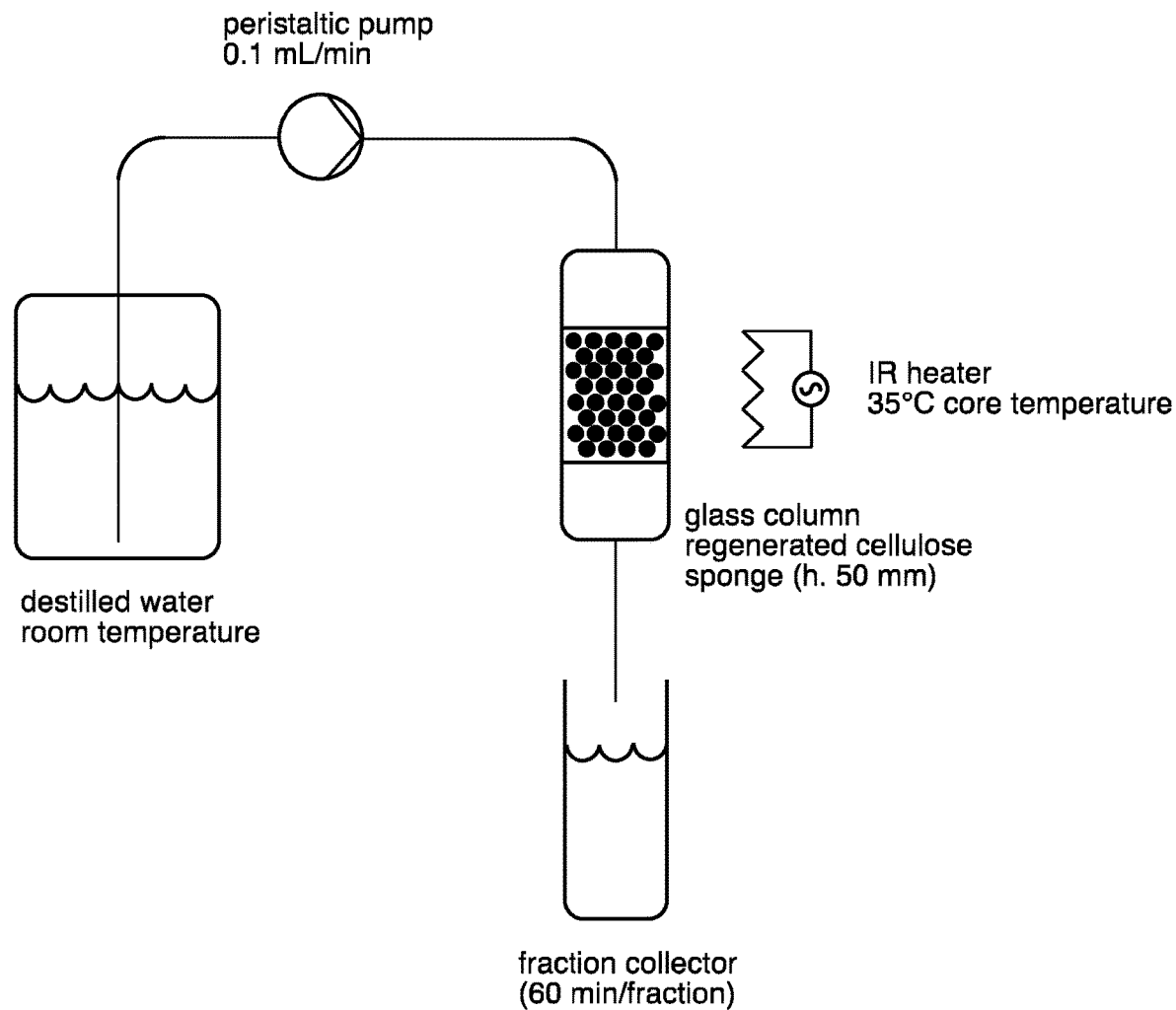
FIG. 1. A fluid model for dissolution of the pessary under physiological conditions. The vaginal fluidic model consists of a reservoir with distilled water, a peristaltic pump, a glass column, and a fraction collector. The water is pumped into the glass column at a rate of 0.1 mL per minute. The pessary is wrapped in an artificial sponge to simulate the vaginal mucous membrane. The glass column is heated to give a core temperature of 35° C. The fluid is collected using a fraction collector set at 60 min per fraction. The pH of each fraction was measured by a pH-electrode.

The present invention relates to pharmaceutical compositions comprising Glucono-5-lactone (GDL) as the active pharmaceutical ingredient and excipients. In one embodiment, the pharmaceutical composition further comprises a gluconate salt. In one embodiment, the pharmaceutical composition further comprises a binder/modified-release agent, such as HPMC; a filler, such as cellulose and/or starch; a glidant, such as silica; and a lubricant, such as magnesium stearate.

In one aspect, the present invention relates to a pharmaceutical composition comprising: Glucono-δ-lactone (GDL); and Hypromellose (HPMC).

In one aspect, the present invention relates to a pharmaceutical composition comprising: Glucono-δ-lactone (GDL); a gluconate salt; and Hypromellose (HPMC).

In one embodiment, the present inventions relates to a pharmaceutical composition comprising: Glucono-δ-lactone (GDL); Sodium gluconate (NaG); and Hypromellose (HPMC).

In one embodiment, said pharmaceutical composition is a solid composition.

The term "pharmaceutical composition" is used herein synonymously with the term "pharmaceutical formulation". In one embodiment, the pharmaceutical composition is in the form of a pharmaceutical dosage form. In one embodiment, the pharmaceutical composition of the present invention is a tablet. In one embodiment, the pharmaceutical composition is suitable for intravaginal administration, i.e. the pharmaceutical composition is applied inside the vagina, such as in the form of a vaginal tablet or a pharmaceutical pessary.

Release Rate

The pharmaceutical composition of the present invention is a slow-release formulation, and the pharmaceutical composition should release GDL over an extended period of time. It is essential that the pharmaceutical composition has a certain release profile so that GDL is released in vivo during an extended period of time, such as 24 hours or 48 hours. In one embodiment, the pharmaceutical composition is to be administered at repeated occasions. In that case, the active pharmaceutical ingredient is preferably completely released before the next dosage is administered. For example, for a once daily administration, the active pharmaceutical ingredient is completely released in vivo within 24 h after administration. For administration every second day, the active pharmaceutical ingredient is completely released in vivo within 48 h after administration. Hence, the pharmaceutical formulation of the present invention is designed to have an optimal release time for the treatment of the infection.

In order to obtain a suitable release profile for GDL, the excipients, such as binder, modified-release agent, filler, glidant and lubricant, are chosen carefully. In this regard, it is essential that the pharmaceutical composition comprises HPMC.

In one embodiment, GDL is released for at least 6 h in vivo, such as for at least 12 h, such as for at least 18 h, such as for at least 24 h, such as for at least 36 h, such as for at least 42 h. In a one embodiment, GDL is released for at least 24 h, such as for at least 36 h. In one embodiment, GDL is released for no more than 72 h, such as for no more than 48 h, such as for no more than 36 h, such as for no more than 24 h. In one embodiment, GDL is released for about 18 to 27 h in vivo. In one embodiment, GDL is released for about 48 h in vivo. In one embodiment, the amount of released GDL is measured using the fluid model as described in Example 10 herein.

During the development of the current pharmaceutical composition, the dissolution rate was measured using the United States Pharmacopeia (USP) Dissolution Apparatus 2—Paddle (37° C.±0.5° C.) in order to predict in vivo drug release profiles, see Example 1 for further details.

For example, it was found that in order to obtain a suitable release profile for GDL in vivo, then no more than 60% of the pharmaceutical composition is dissolved within two hours using United States Pharmacopeia (USP) Dissolution Apparatus 2—Paddle method.

In one aspect, the present invention relates to a solid pharmaceutical composition comprising 5 to 30 wt % glucono-b-lactone (GDL); and 10 to 40 wt % Hypromellose (HPMC), wherein no more than 60% of the pharmaceutical composition is dissolved within two hours using United States Pharmacopeia (USP) Dissolution Apparatus 2—Paddle method.

In one embodiment, no more than 40% of the pharmaceutical composition is dissolved within the first hour using the USP paddle method described above. In one embodiment, no more than 60% of the pharmaceutical composition, such as no more than 50%, such as no more than 40%, is dissolved within the first two hours using the USP paddle method. In one embodiment, no more than 80% of the pharmaceutical composition, such as no more than 75%, such as no more than 50%, is dissolved within the first four hours using the USP paddle method. In one embodiment, no more than 90% of the pharmaceutical composition, such as no more than 85%, such as no more than 65%, is dissolved within the first six hours using the USP paddle method.

In one embodiment, at least 40% of the pharmaceutical composition, such as at least 50%, such as at least 60%, is dissolved within the first four hours using the USP paddle method described above. In one embodiment, at least 50% of the pharmaceutical composition, such as at least 70%, such as at least 75%, is dissolved within the first six hours using the USP paddle method. In one embodiment, at least 60% of the pharmaceutical composition, such as at least 80%, such as at least 90%, is dissolved within the first six hours using the USP paddle method.

In one embodiment, 30 to 50% of the pharmaceutical composition, such as 30 to 40%, is dissolved within the first two hours using the USP paddle method. In one embodiment, 40 to 60% of the pharmaceutical composition, such as 40 to 50%, is dissolved within the first four hours using the USP paddle method. In one embodiment, 50 to 70% of the pharmaceutical composition, such as 55 to 65%, is dissolved within the first six hours using the USP paddle method. In one embodiment, 60 to 80% of the pharmaceutical composition, such as 65 to 75%, is dissolved within the first eight hours using the USP paddle method. In one embodiment, 30 to 50% of the pharmaceutical composition is dissolved, using the USP paddle method, within the first two hours; 40 to 60% of the pharmaceutical composition is dissolved within the first four hours; 50 to 70% of the pharmaceutical composition is dissolved within the first six hours; and 60 to 80% of the pharmaceutical composition is dissolved within the first eight hours. In one embodiment, the pharmaceutical composition having such dissolution rate profile is suitable for administration every second day.

In one embodiment, 30 to 50% of the pharmaceutical composition, such as 35 to 45%, is dissolved within the first two hours using the USP paddle method. In one embodiment, 50 to 70% of the pharmaceutical composition, such as 55 to 65%, is dissolved within the first four hours using the USP paddle method. In one embodiment, 70 to 90% of the pharmaceutical composition, such as 75 to 85%, is dissolved within the first six hours using the USP paddle method. In one embodiment, 80 to 95% of the pharmaceutical composition, such as 85 to 95%, is dissolved within the first eight hours using the USP paddle method. In one embodiment, 35 to 45% of the pharmaceutical composition is dissolved, using the USP paddle method, within the first two hours; 50 to 70% of the pharmaceutical composition is dissolved within the first four hours; 70 to 90% of the pharmaceutical composition is dissolved within the first six hours; and 80 to 95% of the pharmaceutical composition is dissolved within the first eight hours. In one embodiment, the pharmaceutical composition having such dissolution rate profile is suitable for administration once daily.

Glucono-δ-lactone (GDL)

The pharmaceutical composition of the present invention comprises glucono-b-lactone (GDL), CAS number 90-8-2. Glucono-δ-lactone is solid at room temperature and body temperature and is therefore suitable to use as the active ingredient in e.g. a vaginal tablet. In one embodiment, the only active pharmaceutical ingredient of the pharmaceutical composition is GDL.

In one embodiment, the pharmaceutical composition comprises at least 5 wt % GDL, such as at least 10 wt %, such as at least 15 wt %, such as at least 20 wt % GDL. In one embodiment, the pharmaceutical composition comprises no more than 50 wt % GDL, such as no more than 40 wt %, such as no more than 35 wt %, such as no more than 30 wt %, such as no more than 25 wt %, such as no more than 20 wt % GDL. In one embodiment, the pharmaceutical composition comprises 10 to 30 wt % GDL, such as 10 to 25 wt %, such as 15 to 25 wt % GDL, such as about 20 wt % GDL, such as about 15 wt %.

Gluconate Salt

In some embodiments, the pharmaceutical composition of the present invention comprises a gluconate salt, which has a buffering effect, preferably rendering a pH value of about 4, such as in the range of 3.6 and 4.2, more specifically around 3.86. In one embodiment, the pH value is measured in the setting as described in Example 8. The ratio between GDL and gluconate salt may be chosen to provide a suitable pH, such as 3.5 to 4.5, In one embodiment, the molar ratio of GDL and gluconate salt in the pharmaceutical composition is 2:1 to 1:2, such as 3:2 to 2:3, such as about 1:1.

In one embodiment, the gluconate salt is selected from the group consisting of sodium gluconate, potassium gluconate, calcium gluconate, magnesium gluconate, iron(II)gluconate, copper(II)gluconate, and zinc gluconate. In one embodiment, the gluconate salt is sodium gluconate (NaG). Thus, in one embodiment, the NaG of the pharmaceutical composition is replaced by an equimolar amount of another gluconate salt, such as potassium gluconate, calcium gluconate, magnesium gluconate, iron(II)gluconate, copper(II)gluconate, and zinc gluconate.

In one embodiment, the pharmaceutical composition comprises a gluconate salt in at least a concentration that corresponds to an equimolar concentration of 10 wt % NaG, such as of at least 15 wt % NaG, such as of at least 15 wt %, such as of at least 20 wt % NaG. In one embodiment, the pharmaceutical composition comprises a concentration of gluconate salt that corresponds to an equimolar concentration of no more than 30 wt % NaG, such as of no more than 25 wt %, such as of no more than 20 wt % NaG. In one embodiment, the pharmaceutical composition comprises a concentration of gluconate salt that corresponds to an equimolar concentration of 10 to 30 wt % NaG, such as of 15 to 25 wt %, such as of 20 to 25 wt %, such as of 24 to 25 wt % NaG, such as of 18 to 19 wt %.

In one embodiment, the pharmaceutical composition comprises at least 10 wt % NaG, such as at least 15 wt % NaG, such as at least 15 wt %, such as at least 20 wt % NaG.

In one embodiment, the pharmaceutical composition comprises no more than 30 wt % NaG, such as no more than 25 wt %, such as no more than 20 wt % NaG. In one embodiment, the pharmaceutical composition comprises 10 to 30 wt % NaG, such as 15 to 25 wt %, such as 20 to 25 wt %, such as 24 to 25 wt % NaG, such as 18 to 19 wt %.

Hypromellose (HPMC)

The pharmaceutical composition of the present invention comprises at least one hypromellose (HPMC) component. The HPMC component act as a release-modifying agent in the pharmaceutical composition. The term "hypromellose" as used herein refers to hydroxypropyl methylcellulose, CAS number 9004-65-3, E number E464. HPMC is a partly O-methylated and O-(2-hydroxypropylated) cellulose and is available in several grades that differ in molecular weight as well as in the extent of substitution, and therefore also differ in viscosity. HPMC types may be classified based on the extent of substitution, and thus given a four digit number. The first two digits refer to the percentage (w/w) of the methoxy, while the second two digits refer to the percentage of the hydroxypropoxy-groups in the dried substance. In one embodiment, the HPMC component of the present invention is selected from the group consisting of HPMC substitution types 2208 (also known as "K"), 2910 (also known as "E"), 1828 and 2906 (also known as "F"). In one embodiment, the HPMC component is of substitution type 2208 or 2910.

The structure of the HPMC, including the size and extent of substitution, gives rise to viscoelastic properties. In addition to the substitution pattern, the different HPMC grades can be distinguished by the apparent viscosity (mPas) of a 2% (w/w) aqueous solution. In one embodiment, the HPMC component has a viscosity of at least 10 mPas, such as at least 15 mPas, such as at least 20 mPas, such as at least 25 mPas, such as at least 30 mPas, such as at least 35 mPas, such as at least 40 mPas, such as at least 45 mPas, such as at least 50 mPas, such as at least 55 mPas, such as at least 60 mPas, such as at least 65 mPas, such as at least 70 mPas, such as at least 75 mPas. In one embodiment, the HPMC component has a viscosity of at least 50 mPas. In one embodiment, the HPMC component has a viscosity of no more than 400.000 mPas, such as no more than 300.000 mPas, such as no more than 200.000 mPas, such as no more than 150.000 mPas, such as no more than 100.000 mPas, such as no more than 50.000 mPas, such as no more than 10.000 mPas, such as no more than 1.000 mPas, such as no more than 500 mPas, such as no more than 250 mPas. In one embodiment, the HPMC component has a viscosity in the range of 80 to 280.000 mPas, such as in the range of 80 to 120 mPas, such as in the range of 2.600 to 5.000 mPas, or such as in the range of 150.000 to 280.000 mPas. In one embodiment, the HPMC component has a viscosity of about 100.000 mPas. In one embodiment, the HPMC component has a viscosity of about 200.000 mPas. In one embodiment, the HPMC component has a viscosity of about 4000 mPas. In one embodiment, the HPMC component has a viscosity of about 100 mPas. In one embodiment, the HPMC component has a viscosity of about 15 mPas.

Said HPMC component may be selected from the group consisting of Methocel K100, Methocel K4M and Methocel K200M.

In one embodiment, the pharmaceutical composition comprises at least 5 wt % HPMC, such as at least 10 wt %, such as at least 10 wt %, such as at least 15 wt %, such as at least 20 wt %, such as at least 25 wt %, such as at least 30 wt %, such as at least 35 wt %, such as at least 40 wt %, such as at least 45 wt %, such as at least 50 wt % HPMC. In one embodiment, the pharmaceutical comprises no more than 60 wt % HPMC, such as no more than 55 wt %, such as no more than 50 wt %, such as no more than 45 wt %, such as no more than 45 wt %, such as no more than 40 wt %, such as no more than 35 wt %, such as no more than 30 wt %, such as no more than 25 wt %, such as no more than 20 wt %, such as no more than 15 wt %, such as no more than 10 wt % HPMC. In one embodiment, the pharmaceutical composition comprises in the range of 5 to 60 wt % HPMC, such as 15 to 40 wt %, such as 5 to 25 wt %, such as 10 to 20 wt %, such as 10 to 40 wt %, such as 20 to 35 wt %, such as 30 to 40 wt % HPMC. In one embodiment, the pharmaceutical composition comprises in the range of 5 to 30 wt % HPMC, such as 10 to 20 wt %, such as about 15 wt % HPMC. In one embodiment, the pharmaceutical composition comprises in the range of 25 to 45 wt % HPMC, such as 30 to 30 wt %, such as about 35.5 wt %.

Silica

In some embodiments, the pharmaceutical composition further comprises silica. Said silica may be selected from the group consisting of colloidal anhydrous silica, colloidal silicone dioxide, colloidal hydrated silica and hydrophobic colloidal silica. In one embodiment, said silica is colloidal silica. In one embodiment, said silica has a specific surface area of 175 to 225 $m^2/g$, such as about 200 $m^2/g$, and/or an average primary particle size of 12 nm. In one embodiment, the silica has a pH value of 3.7 to 4.5 in 4% dispersion. In one embodiment, said silica is Aerosil 200.

In one embodiment, the pharmaceutical composition comprises 0.1 to 5 wt % silica, such as 0.1 to 2 wt %, such as 0.3 to 0.6 wt %, such as about 0.5 wt %, such as about 0.38 wt % silica.

Lubricant

In some embodiments, the pharmaceutical composition further comprises a lubricant. Said lubricant may be selected from the group consisting of magnesium stearate, calcium stearate, stearic acid, sodium stearylfumarate, glyceryl behenate, glyceryl monooloeate, glyceryl monostearate, glyceryl palmitostearate, sucrose palmitate and sucrose stearate. In one embodiment, said lubricant is magnesium stearate.

In one embodiment, the pharmaceutical composition comprises 0.1 to 5 wt % lubricant, such as 0.1 to 2 wt %, such as 0.70 to 1.3 wt %, such as about 1 wt %, such as about 0.75 wt %, such as about 0.38 wt % lubricant.

Starch

In some embodiments, the pharmaceutical composition further comprises starch. In one embodiment, said starch is pregelatinized starch. In one embodiment, said starch is a partially pregelatinized maize starch. In one embodiment, said starch comprises amylopectin and amylose, such as in a 3:1 ratio. The gelatinization level of said starch may be about 20%. The particle size of said starch may be about 65 micron. In one embodiment, said starch is Starch 1500®.

In one embodiment, the pharmaceutical composition comprises at least 10 wt % starch, such as at least 15 wt %, such as at least 20 wt %, such as at least 30 wt %, such as at least 40 wt %. In one embodiment, the pharmaceutical composition comprises no more than 45 wt % starch, such as no more than 40 wt %, such as no more than 35 wt %, such as no more than 30 wt %, such as no more than 25 wt %, such as no more than 20 wt %. In one embodiment, the pharmaceutical composition comprises 10 to 50 wt % starch, such as 10 to 30 wt %, such as 10 to 25 wt %, such as 10 to 20 wt %, such as about 19 wt %, such as about 14.25 wt % starch.

Cellulose

In some embodiments, the pharmaceutical composition further comprises cellulose. Said cellulose may be selected from the group consisting of microcrystalline cellulose (MCC), silicified microcrystalline cellulose and powder cellulose. In one embodiment, said cellulose is MCC. In one embodiment, said MCC has a nominal particle size of at least 20 µm, such as at least 50 µm, such as at least 75 µm, such as at least 100 µm, such as at least 125 µm, such as at least 140 µm, such as at least 150 µm, such as at least 160 µm. In one embodiment, said MCC has a nominal particle size of no more than 200 µm, such as no more than 190 µm, such as no more than 180 µm, such as no more than 170 µm, such as no more than 160 µm. In one embodiment, said MCC has a nominal particle size in the range of 140 to 200 µm, such as about 150 to about 180 µm.

In one embodiment, the pharmaceutical composition comprises at least 20 wt % cellulose, such as at least 30 wt %, such as at least 40 wt %, such as at least 50 wt % cellulose. In one embodiment, the pharmaceutical composition comprises no more than 60 wt % cellulose, such as no more than 50 wt %, such as no more than 40 wt %, such as no more than 30 wt % cellulose. In one embodiment, the pharmaceutical composition comprises 20 to 60 wt % cellulose, such as 20 to 30 wt %, such as 40 to 60 wt %, such as 50 to 60 wt %, such as 30 to 40 wt %, such as 35 to 40 wt %, such as about 36 wt % cellulose.

Lactose and Sugar Alcohol

In some embodiments, the pharmaceutical composition further comprises lactose or a sugar alcohol. In one embodiment, said lactose or sugar alcohol is in the form of a monohydrate. In one embodiment, said sugar alcohol is mannitol. In one embodiment, said lactose is α-lactose.

In one embodiment, the pharmaceutical composition comprises 40 to 70 wt % lactose or sugar alcohol, such as 50 to 60 wt % lactose or sugar alcohol.

Pharmaceutical Compositions

The amount of the various components of the pharmaceutical composition is sometimes given in the present disclosure in wt %. In such cases, the sum of the wt % of the components does not exceed 100 wt %. In some embodiments, the pharmaceutical composition of the present invention comprises or consists of: GDL, gluconate salt, HPMC, starch, silica and magnesium stearate. In one embodiment, the pharmaceutical composition comprises or consists of: 10 to 25 wt % GDL; 15 to 30 wt % NaG; 10 to 40 wt % HPMC; 10 to 25 wt % starch; 0.25 to 1.25 wt % silica; and 0.5 to 1.5 wt % magnesium stearate.

In one embodiment, the pharmaceutical composition comprises or consists of: 10 to 25 wt % GDL; 15 to 30 wt % NaG; 30 to 40 wt % HPMC; 15 to 45 wt % starch; 0.25 to 1.25 wt % silica; and 0.5 to 1.5 wt % magnesium stearate. In one embodiment, the pharmaceutical composition comprises or consists of: 15 to 25 wt % GDL; 20 to 30 wt % NaG; 30 to 40 wt % HPMC; 15 to 25 wt % starch; 0.25 to 1.25 wt % silica; and 0.5 to 1.5 wt % magnesium stearate.

In one embodiment, the pharmaceutical composition comprises or consists essentially of about: 20 wt % GDL; 24.5 wt % NaG; 35.5 wt % HPMC; 19 wt % starch; 0.5 wt % silica; and 1 wt % magnesium stearate. In one embodiment, said HPMC is of viscosity type 100.000 mPas and/or has a degree of substitution of 2208.

In one embodiment, the pharmaceutical composition comprises or consists essentially of about: 20 wt % GDL; 24.1 wt % NaG; 30 wt % HPMC; 24.4 wt % starch; 0.5 wt % silica; and 1 wt % magnesium stearate. In another embodiment, the pharmaceutical composition comprises or consists essentially of about: 20 wt % GDL; 24.1 wt % NaG; 35 wt % HPMC; 19.4 wt % starch; 0.5 wt % silica; and 1 wt % magnesium stearate. In another embodiment, the pharmaceutical composition comprises or consists essentially of about: 20 wt % GDL; 24.5 wt % NaG; 35 wt % HPMC; 19 wt % starch; 0.5 wt % silica; and 1 wt % magnesium stearate. In another embodiment, the pharmaceutical composition comprises or consists essentially of about: 20 wt % GDL; 24.5 wt % NaG; 35 wt % HPMC; 19.25 wt % starch; 0.5 wt % silica; and 0.75 wt % magnesium stearate. In another embodiment, the pharmaceutical composition comprises or consists essentially of about: 20 wt % GDL; 24.5 wt % NaG; 35 wt % HPMC; 18.75 wt % starch; 0.5 wt % silica; and 1.25 wt % magnesium stearate. In another embodiment, the pharmaceutical composition comprises or consists essentially of about: 20 wt % GDL; 24.5 wt % NaG; 35 wt % HPMC; 19 wt % starch; 0.5 wt % silica; and 1 wt % magnesium stearate. In another embodiment, the pharmaceutical composition comprises or consists essentially of about: 10 wt % GDL; 12.25 wt % NaG; 35 wt % HPMC; 41.5 wt % starch; 0.5 wt % silica; and 1.25 wt % magnesium stearate. In another embodiment, the pharmaceutical composition comprises or consists essentially of about: 10 wt % GDL; 12.25 wt % NaG; 35 wt % HPMC; 41.5 wt % starch; 0.5 wt % silica; and 0.75 wt % magnesium stearate. In another embodiment, the pharmaceutical composition comprises or consists essentially of about 15 wt % GDL; 18.375 wt % NaG; 35 wt % HPMC; 30.125 wt % starch; 0.5 wt % silica; and 1 wt % magnesium stearate.

In yet another embodiment, the pharmaceutical composition of the present invention comprises or consists of GDL, gluconate salt, HPMC, silica and magnesium stearate. In one embodiment, the pharmaceutical composition comprises or consists of: 15 to 25 wt % GDL; 20 to 30 wt % NaG; 45 to 65 wt % HPMC; 0.25 to 1.25 wt % silica; and 0.5 to 1.5 wt % magnesium stearate. In one embodiment, said pharmaceutical composition comprises or consists essentially of about: 20 wt % GDL; 24.1 wt % NaG; 54.4 wt % HPMC; 0.5 wt % silica; and 1 wt % magnesium stearate.

In yet another embodiment, the pharmaceutical composition of the present invention comprises or consists of GDL, gluconate salt, HPMC, MCC, silica and magnesium stearate. In one embodiment, the pharmaceutical composition comprises or consists of: 15 to 25 wt % GDL; 20 to 30 wt % NaG; 25 to 40 wt % HPMC; 10 to 30 wt % MCC; 0.25 to 1.25 wt % silica; and 0.5 to 1.5 wt % magnesium stearate. In one embodiment, said pharmaceutical composition comprises or consists essentially of about: 20 wt % GDL; 24.1 wt % NaG; 30 wt % HPMC; 24.4 wt % MCC; 0.5 wt % silica; and 1 wt % magnesium stearate.

In yet another embodiment, the pharmaceutical composition of the present invention comprises or consists of GDL, gluconate salt, HPMC, MCC, starch, silica and magnesium stearate. In one embodiment, the pharmaceutical composition comprises or consists of: 10 to 25 wt % GDL; 10 to 30 wt % NaG; 5 to 40 wt % HPMC; 10 to 45 wt % MCC; 10 to 20 wt % starch; 0.25 to 1.25 wt % silica; and 0.5 to 1.5 wt % magnesium stearate. In one embodiment, the pharmaceutical composition comprises or consists of: 10 to 20 wt % GDL; 10 to 25 wt % NaG; 5 to 25 wt % HPMC; 15 to 45 wt % MCC; 10 to 20 wt % starch; 0.25 to 1.25 wt % silica; and 0.5 to 1.5 wt % magnesium stearate. In one embodiment, said pharmaceutical composition comprises or consists essentially of about: 15 wt % GDL; 18.4 wt % NaG; 15 wt % HPMC; 36 wt % MCC; 14.25 wt % starch; 0.38 wt % silica; and 1.0 wt % magnesium stearate. In one embodiment, said pharmaceutical composition comprises or consists essentially of about: 15 wt % GDL; 18.4 wt % NaG; 20 wt % HPMC; 31.25 wt % MCC; 14.25 wt % starch; 0.38 wt % silica; and 0.75 wt % magnesium stearate. In one embodiment, said pharmaceutical composition comprises or consists essentially of about: 15 wt % GDL; 18.4 wt % NaG; 10 wt % HPMC; 41.25 wt % MCC; 14.25 wt % starch; 0.38 wt % silica; and 0.75 wt % magnesium stearate. In one embodiment, said HPMC is of viscosity type 100 mPas.

In one embodiment, the pharmaceutical composition does not comprise a further anti-fungal agent, such as an anti-fungal agent selected from the group consisting of miconazole, terconazole, isoconazole, fenticonazole, fluconazole, nystatin, ketoconazole, clotrimazole, butoconazole, econazole, tioconazole, itraconazole, 5-fluoracil, and metronidazole.

Physical Properties of the Dosage Form

In one embodiment, the pharmaceutical composition is in the form of a dosage form, such as a solid dosage form, for example a tablet. In one embodiment, the mass of the dosage form is at least 0.5 g, such as at least 0.7 g, such as at least 0.85 g, such as at least 1.0 g, such as at least 1.25 g, such as at least 1.4 g. In one embodiment, the mass of the dosage form is no more than 2.0 g, such as no more than 1.75 g, such as no more than 1.5 g, such as no more than 1.0 g, such as no more than 0.9 g. In one embodiment, the mass of the dosage form is in the range of 0.5 to 2.0 g, such as in the range of 0.7 to 1.75 g, such as in the range of 1.4 to 1.6 g. In one embodiment, the mass of the dosage form is about 1.5 g. In one embodiment, the mass of the dosage form is in the range of 0.5 to 2.0 g, such as in the range of 0.5 to 1.25 g, such as in the range of 0.7 to 1.0 g. In one embodiment, the mass of the dosage form is about 0.85 g. In one embodiment, the mass of the dosage form is about 1.0 g.

In one embodiment, the dosage form is bullet shaped.

In one embodiment, the dosage form has a width of at least 5 mm, such as at least 7 mm, such as at least 9 mm, such as at least 10 mm. In one embodiment, the dosage form has a width of no more than 15 mm, such as no more than 12 mm, such as no more than 11 mm, such as no more than 10 mm. In one embodiment, the dosage form has a width in the range of 8 to 12 mm, such as in the range of 8.5 to 11 mm, such as 10 to 10.5 mm. In one embodiment, the dosage form has a width in the range of 7.0 to 12 mm, such as in the range of 8.0 to 10 mm, such as 8.5 to 9.5 mm. In one embodiment, the dosage form has a width in the range of 10 to 10.5 mm or 8.5 to 9.5 mm.

In one embodiment, the dosage form has a length of at least 10 mm, such as at least 15 mm, such as at least 20 mm. In one embodiment, the dosage form has a length of no more than 30 mm, such as no more than 25 mm, such as no more than 20 mm. In one embodiment, the dosage form has a length in the range of 10 to 30 mm, such as in the range of 15 to 20 mm, such as in the range of 16 to 18 mm. In one embodiment, the dosage form has a length in the range of 10 to 30 mm, such as in the range of 22 to 27 mm, such as in the range of 24 to 25 mm. In one embodiment, the dosage form has a length in the range of 16 to 18 mm or 24 to 25 mm.

In one embodiment, the dosage form has a width in the range of 10 to 10.5 mm and a length of 24 to 25 mm. In another embodiment, the dosage form has a width in the range of 8.5 to 9.5 mm and a length of 16 to 18 mm. In another embodiment, the dosage form has a width in the range of 10.0 to 10.5 mm and a length of 16 to 18 mm.

In one embodiment, the amount of GDL in the dosage form is 50 to 500 mg, such as 100 to 400 mg, such as 250 to 350 mg, such as about 300 mg or about 150 mg.

In one embodiment, the breaking force for the pharmaceutical composition is in the range of 5 to 25 kp, such as 5 to 15 kp or 15 to 25 kp.

In one embodiment, the friability of the pharmaceutical composition is in the range of 0.01 to 1%, such as 0.01 to 0.5%, such as 0.2 to 0.5%.

As demonstrated in Example 11 herein, the pharmaceutical composition as disclosed herein is stable for at least 6 months in 25° C., as well as in 40° C. In one embodiment, the pharmaceutical composition is stable for at least 6 months in 25° C., such as for at least 6 months in 40° C.

Kit of Parts

In one aspect, the present invention relates to a kit-of-parts comprising the pharmaceutical composition as disclosed herein and an applicator. In one embodiment, the kit-of parts further comprises instructions.

Medical Use

In one aspect, the pharmaceutical composition of the present invention is for use as a medicament. In a further aspect, the pharmaceutical composition is for use in the treatment of microbial infections. The term "treatment" as used herein refers to treatment, prevention and/or alleviation of one or more indications.

As demonstrated in Examples 13 and 14, the pharmaceutical composition as disclosed herein causes no irritant effects to the vaginal mucosa, and causes no reactions identified as sensitization. The pharmaceutical composition as disclosed herein are suitable for medical use.

In some embodiments, the microbial infection is a vaginal urogenital infection. In a preferred embodiment, said microbial infection is a vaginal infection. In one embodiment, said microbial infection is selected from the group consisting of fungal infections, bacterial infections and mixed fungal and bacterial infections. In one embodiment, said microbial infection is vaginal candidiasis, such as classified in B37.3 of the World Health Organization's 10th revision of the International Statistical Classification of Diseases and Related Health Problems (ICD-10). Vaginal candidiasis is characterized by the presence of *candida* species, where *Candida albicans* is the most frequent. GDL has in preclinical studies been shown to give rise to a significant reduction of *Candida albicans* present in the hyphal, i.e. the pathogenic form [WO 2017/174731]. The hyphal form has the ability to invade tissue and induce inflammation, mediated by candidalysin, a cytotoxic peptide toxin that destroys the epithelial cells of the vagina, and to form biofilm, i.e. a complex three-dimensional structure of the pathogen bound to cell walls as well as to other pathogen cells. It has been shown that biofilm formation is required for vulvovaginal *Candida* infections, and that the biofilm formation in *Candida albicans* and other *Candida* species can be significantly reduced by GDL.

In some embodiments, said microbial infection is a fungal infection. In one embodiment, said fungal infection is a mycosis, such a mycosis is Candidiasis. In one embodiment, said Candidiasis is Candidiasis of vulva and vagina or Candidiasis of urogenital sites. In one embodiment, said fungal infection is caused by *Candida albicans, Candida krusei, Candida glabrata, Candida tropicalis, Trichophyton verrucosum, Trichophyton rubrum, Trichophyton violaceum, Trichophyton tonsurans, Microsporum canis, Malassezia* and/or *Aspergillus*.

In some embodiments, said microbial infection is a bacterial infection. In preclinical studies, GDL been demonstrated to be useful in the treatment of bacterial infections [WO 2019/068862]. In one embodiment, the bacterial infection is bacterial vaginosis. In one embodiment, said bacterial infection is caused by *Gardnerella vaginalis, Chlamydia trachomatis, Neisseria gonorrhoeae, Treponema pallidum* (syphilis), *Atopobium vaginae, Prevotella* spp, *Mobiluncus* spp, *Peptostreptococcus* spp, *Poryphyromonas* spp, *Mycoplasma hominis, Bacteroides* spp, *Ureaplasma urealyticum, Streptococcus* spp, Enterobacteriaceae, Enterococci, *Staphylococcus* spp, *Propionibacterium, Escherichia coli, Klebsiella, Staphylococcus epidermidis, Staphylococcus aureus, Pseudomonas aeruginosa, Acetinobacter baumanii, Streptococcus pyogenes, Streptococcus agalactiae*, Beta-Hemolytic Streptococci Groups C and G and/or *Porphyromonas gingivalis*.

In one embodiment, said infection is an infection in a mammal. In one embodiment, said mammal is human. Preferably, said mammal is a woman. In one embodiment, said woman is pregnant. In some embodiments, said pregnancy is low-risk; in some embodiments, said pregnancy is high-risk. In one embodiment, said high-risk pregnancy is subject to the risk of preterm birth as defined by previous preterm birth, short cervical length, the presence of biomarkers or other indications thereof.

Upon use in the treatment of a vaginal microbial infection, the pharmaceutical composition has a pH-lowering and biofilm-inhibiting effect.

Method for Manufacturing

In one aspect, the present invention relates to a method for manufacturing the pharmaceutical composition as defined herein, said method comprises the steps:
 a. Sieving GDL, gluconate salt (such as NaG), HPMC;
 b. Mixing the sieved components in a.; and
 c. Compressing the powder mixture in b. to tablets.

In one embodiment, said method further comprises steps of mixing sieved silica with the sieved components of step a., and adding a lubricant, which is pre-mixed with a portion of the mixture generated in step b., i.e. the method comprises the steps:
 a. Sieving GDL, gluconate salt (such as NaG), HPMC;
 b. Mixing sieved silica with the sieved components in a.;
 c. Mixing lubricant with a portion of the mixture in b.;
 d. Adding the mixture in c. to the remaining mixture in b. and mixing; and
 e. Compressing the powder mixture in formed d. to tablets.

Importantly, the lubricant, for example magnesium stearate, is added at a later stage than the other components since a prolonged mixing time had negative effects on the properties of the tablet.

In one embodiment, the breaking force for the formed tablets is at least 10 kp.

In one embodiment, the tablets are produced by direct compression in a 10.3×24.45 mm punch/die set.

In one embodiment, the formed tablet is bullet shaped with a width in the range of 8 to 12 mm, such as in the range of 9 to 11 mm, such as 10 to 10.5 mm, and a length in the range of 15 to 30 mm, such as in the range of 20 to 30 mm, such as in the range of 22 to 27 mm, such as in the range of 24 to 25 mm. In one embodiment, the formed tablet has a mass of about 1.5 g. In one embodiment, the formed tablet is bullet shaped with a width in the range of 9 to 13 mm, a length in the range of 17 to 19 mm, and a mass of about 1.0 g.

Items

1. A pharmaceutical composition comprising
   a. Glucono-δ-lactone (GDL); and
   b. Hypromellose (HPMC).
2. The pharmaceutical composition according to item 1, wherein the pharmaceutical composition comprises a. Glucono-δ-lactone (GDL);
b. A gluconate salt; and
c. Hypromellose (HPMC).
3. The pharmaceutical composition according to item 2, wherein the gluconate salt is selected from the group consisting of sodium gluconate, potassium gluconate, calcium gluconate, magnesium gluconate, iron(II)gluconate, copper(II)gluconate, and zinc gluconate.
4. The pharmaceutical composition according to item 2, wherein the gluconate salt is sodium gluconate (NaG).
5. The pharmaceutical composition according to any one of items 2 and 4, wherein the pharmaceutical composition comprises
a. Glucono-δ-lactone (GDL);
b. Sodium gluconate (NaG); and
c. Hypromellose (HPMC).
6. The pharmaceutical composition according to any one of the preceding items, wherein the pharmaceutical composition is a solid composition.
7. The pharmaceutical composition according to any one of the preceding items, wherein the pharmaceutical composition is for vaginal administration.
8. The pharmaceutical composition according to any one of the preceding items, wherein GDL is released for at least 6 h in vivo, such as for at least 12 h, such as for at least 18 h, such as for at least 24 h, such as for at least 36 h, such as for at least 42 h in vivo.
9. The pharmaceutical composition according to any one of the preceding items, wherein GDL is released for at least 24 h, such as for at least 36 h in vivo.
10. The pharmaceutical composition according to any one of the preceding items, wherein GDL is released for no more than 72 h, such as for no more than 48 h in vivo.
11. The pharmaceutical composition according to any one of the preceding items, wherein the pharmaceutical composition is in the form of a pharmaceutical dosage form.
12. The pharmaceutical composition according to any one of the preceding items, wherein the pharmaceutical composition is a tablet.
13. The pharmaceutical composition according to item 12, wherein the mass of the tablet is at least 0.5 g, such as at least 0.7 g, such as at least 0.85 g, such as at least 1.0 g, such as at least 1.25 g, such as at least 1.4 g.
14. The pharmaceutical composition according to any one of items 12 to 13, wherein the mass of the tablet is no more than 2.0 g, such as no more than 1.75 g, such as no more than 1.5 g, such as no more than 1.0 g, such as no more than 0.9 g.
15. The pharmaceutical composition according to item 12, wherein the mass of the tablet is in the range of 0.5 to 2.0 g, such as in the range of 0.7 to 1.75 g, such as in the range of 1.4 to 1.6 g, such as about 1.5 g.
16. The pharmaceutical composition according to item 12, wherein the mass of the tablet is in the range of 0.5 to 2.0 g, such as in the range of 0.5 to 1.25 g, such as in the range of 0.7 to 1.0 g, such as about 0.85 g.
17. The pharmaceutical composition according to any one of the items 12 to 16, wherein the tablet is bullet shaped.
18. The pharmaceutical composition according to any one of the items 12 to 17, wherein the tablet has a width of at least 5 mm, such as at least 7 mm, such as at least 9 mm, such as at least 10 mm.
19. The pharmaceutical composition according to any one of the items 12 to 18, wherein the tablet has a width of no more than 15 mm, such as no more than 12 mm, such as no more than 11 mm, such as no more than 10 mm.
20. The pharmaceutical composition according to any one of the items 12 to 17, wherein the tablet has a width in the range of 8 to 12 mm, such as in the range of 8.5 to 11 mm, such as 10 to 10.5 mm.
21. The pharmaceutical composition according to any one of the items 12 to 17, wherein the tablet has a width in the range of 7.0 to 12 mm, such as in the range of 8.0 to 10 mm, such as 8.5 to 9.5 mm.
22. The pharmaceutical composition according to any one of the items 12 to 21, wherein the tablet has a length of at least 10 mm, such as at least 15 mm, such as at least 20 mm.
23. The pharmaceutical composition according to any one of the items 12 to 22, wherein the tablet has a length of no more than 30 mm, such as no more than 25 mm, such as no more than 20 mm.
24. The pharmaceutical composition according to any one of the items 12 to 21, wherein the tablet has a length in the range of 10 to 30 mm, such as in the range of 15 to 20 mm, such as in the range of 16 to 18 mm.
25. The pharmaceutical composition according to any one of the items 12 to 21, wherein the tablet has a length in the range of 10 to 30 mm, such as in the range of 22 to 27 mm, such as in the range of 24 to 25 mm.
26. The pharmaceutical composition according to any one of the preceding items, wherein the amount of GDL is 50 to 500 mg, such as 100 to 400 mg, such as 250 to 350 mg, such as about 300 mg.
27. The pharmaceutical composition according to any one of the preceding items, wherein the composition comprises at least 5 wt % GDL, such as at least 10 wt %, such as at least 15 wt %, such as at least 20 wt % GDL.
28. The pharmaceutical composition according to any one of the preceding items, wherein the composition comprises no more than 50 wt % GDL, such as no more than 40 wt %, such as no more than 35 wt %, such as no more than 30 wt %, such as no more than 25 wt %, such as no more than 20 wt % GDL.
29. The pharmaceutical composition according to any one of the preceding items, wherein the composition comprises in the range of 10 to 30 wt % GDL, such as 15 to 25 wt % GDL, such as about 20 wt % GDL.
30. The pharmaceutical composition according to any one of the preceding items, wherein the composition comprises a gluconate salt in at least a concentration that corresponds to an equimolar concentration of 10 wt % NaG, such as of at least 15 wt % NaG, such as of at least 20 wt % NaG.
31. The pharmaceutical composition according to any one of the preceding items, wherein the composition comprises at least 10 wt % NaG, such as at least 15 wt % NaG, such as at least 20 wt % NaG.
32. The pharmaceutical composition according to any one of the preceding items, wherein the composition comprises no more than 30 wt % NaG, such as no more than 25 wt %, such as no more than 20 wt % NaG.
33. The pharmaceutical composition according to any one of the preceding items, wherein the composition comprises in the range of 10 to 30 wt % NaG, such as 15 to 25 wt %, such as 20 to 25 wt %, such as 24 to 25 wt % NaG.

34. The pharmaceutical composition according to any one of the preceding items, wherein the molar ratio of GDL and gluconate salt is 2:1 to 1:2, such as 3:2 to 2:3, such as about 1:1.
35. The pharmaceutical composition according to any one of the preceding items, wherein the molar ratio of GDL and NaG is 2:1 to 1:2, such as 3:2 to 2:3, such as about 1:1.
36. The pharmaceutical composition according to any one of the preceding items, wherein the HPMC is selected from the group consisting of HPMC substitution types 2208, 2910, 1828 and 2906.
37. The pharmaceutical composition according to any one of the preceding items, wherein the HPMC is of substitution type 2208 or 2910.
38. The pharmaceutical composition according to any one of the preceding items, wherein the HPMC has a viscosity of at least 10 mPas, such as at least 15 mPas, such as at least 20 mPas, such as at least 25 mPas, such as at least 30 mPas, such as at least 35 mPas, such as at least 40 mPas, such as at least 45 mPas, such as at least 50 mPas, such as at least 55 mPas, such as at least 60 mPas, such as at least 65 mPas, such as at least 70 mPas, such as at least 75 mPas.
39. The pharmaceutical composition according to any one of the preceding items, wherein the HPMC has a viscosity of no more than 400.000 mPas, such as no more than 300.000 mPas, such as no more than 200.000 mPas, such as no more than 150.000 mPas, such as no more than 100.000 mPas, such as no more than 50.000 mPas, such as no more than 10.000 mPas, such as no more than 1.000 mPas, such as no more than 500 mPas, such as no more than 250 mPas.
40. The pharmaceutical composition according to any one of the preceding items, wherein the HPMC has a viscosity in the range of 50 to 200 mPas, such as about 100 mPas.
41. The pharmaceutical composition according to any one of the preceding items, wherein the HPMC has a viscosity in the range or 50.000 mPas to 200.000 mPas, such as about 100.000 mPas.
42. The pharmaceutical composition according to any one of the preceding items, wherein the composition comprises at least 5 wt % HPMC, such as at least 10 wt %, such as at least 10 wt %, such as at least 15 wt %, such as at least 20 wt %, such as at least 25 wt %, such as at least 30 wt %, such as at least 35 wt %, such as at least 40 wt %, such as at least 45 wt %, such as at least 50 wt % HPMC.
43. The pharmaceutical composition according to any one of the preceding items, wherein the composition comprises no more than 60 wt % HPMC, such as no more than 55 wt %, such as no more than 50 wt %, such as no more than 45 wt %, such as no more than 45 wt %, such as no more than 40 wt %, such as no more than 35 wt %, such as no more than 30 wt %, such as no more than 25 wt %, such as no more than 20 wt %, such as no more than 15 wt %, such as no more than 10 wt % HPMC.
44. The pharmaceutical composition according to any one of the preceding items, wherein the composition comprises in the range of 5 to 60 wt % HPMC, such as 15 to 40 wt %, such as 20 to 35 wt % HPMC.
45. The pharmaceutical composition according to any one of the preceding items, wherein the composition further comprises silica.
46. The pharmaceutical composition according to item 45, wherein the silica is selected from the group consisting of colloidal anhydrous silica, colloidal silicone dioxide, colloidal hydrated silica and hydrophobic colloidal silica.
47. The pharmaceutical composition according to any one of items item 45 to 46, wherein the composition comprises in the range of 0.1 to 5 wt % silica, such as 0.1 to 2 wt %, such as about 0.5 wt % silica.
48. The pharmaceutical composition according to any one of the preceding items, wherein the composition further comprises a lubricant.
49. The pharmaceutical composition according to item 48, wherein the lubricant is selected from the group consisting of magnesium stearate, calcium stearate, stearic acid, sodium stearylfumarate, glyceryl behenate, glyceryl monooloeate, glyceryl monostearate, glyceryl palmitostearate, sucrose palmitate and sucrose stearate.
50. The pharmaceutical composition according to any one of items 48 to 49, wherein the lubricant is magnesium stearate.
51. The pharmaceutical composition according to any one of items 48 to 50, wherein the composition comprises in the range of 0.1 to 5 wt % lubricant, such as 0.1 to 2 wt %, such as 0.70 to 1.3 wt %, such as about 1 wt % lubricant.
52. The pharmaceutical composition according to any one of the preceding items, wherein the composition further comprises starch.
53. The pharmaceutical composition according to item 52, wherein the starch is pregelatinised starch.
54. The pharmaceutical composition according to any one of the preceding items, wherein the composition comprises at least 10 wt % starch, such as at least 15 wt %, such as at least 20 wt %, such as at least 30 wt %, such as at least 40 wt %.
55. The pharmaceutical composition according to any one of the preceding items, wherein the composition comprises no more than 45 wt % starch, such as no more than 40 wt %, such as no more than 35 wt %, such as no more than 30 wt %, such as no more than 25 wt %, such as no more than 20 wt %.
56. The pharmaceutical composition according to any one of the preceding items, wherein the composition comprises in the range of 10 to 50 wt % starch, such as 10 to 30 wt %, such as 15 to 25 wt %, such as 10 to 20 wt % starch.
57. The pharmaceutical composition according to any one of the preceding items, wherein the composition further comprises cellulose.
58. The pharmaceutical composition according to item 57, wherein the cellulose is selected from the group consisting of microcrystalline cellulose (MCC), silicified microcrystalline cellulose and powder cellulose.
59. The pharmaceutical composition according to any one of items 57 to 58, wherein the cellulose is MCC.
60. The pharmaceutical composition according to item 59, wherein the MCC has a nominal particle size of at least 20 μm, such as at least 50 μm, such as at least 75 μm, such as at least 100 μm, such as at least 125 μm, such as at least 140 μm, such as at least 150 μm, such as at least 160 μm.
61. The pharmaceutical composition according to any one of items 59 to 60, wherein the MCC has a nominal particle size of no more than 200 μm, such as no more than 190 μm, such as no more than 180 μm, such as no more than 170 μm, such as no more than 160 μm.

62. The pharmaceutical composition according to any one of items 59 to 61, wherein the MCC has a nominal particle size in the range of 140 to 200 µm, such as about 150 to about 180 µm.
63. The pharmaceutical composition according to any one of items 57 to 62, wherein the composition comprises at least 20 wt % cellulose, such as at least 30 wt %, such as at least 40 wt %, such as at least 50 wt % cellulose.
64. The pharmaceutical composition according to any one of items 57 to 63, wherein the composition comprises no more than 60 wt % cellulose, such as no more than 50 wt %, such as no more than 40 wt %, such as no more than 30 wt % cellulose.
65. The pharmaceutical composition according to any one of items 57 to 62, wherein the composition comprises in the range of 20 to 60 wt % cellulose, such as 20 to 30 wt %, such as 30 to 40 wt % or such as 50 to 60 wt % cellulose.
66. The pharmaceutical composition according to any one of the preceding items, wherein the composition further comprises lactose or a sugar alcohol.
67. The pharmaceutical composition according to item 66, wherein the lactose is α-lactose.
68. The pharmaceutical composition according to any one of items 66 to 67, wherein the lactose is in the form of a monohydrate.
69. The pharmaceutical composition according to item 66, wherein the sugar alcohol is mannitol.
70. The pharmaceutical composition according to any one of items 66 to 69, wherein the wherein the composition comprises in the range of 40 to 70 wt % lactose or sugar alcohol, such as 50 to 60 wt % lactose or sugar alcohol.
71. The pharmaceutical composition according to any one of the preceding items, wherein the composition comprises or consists of GDL, gluconate salt, HPMC, starch, silica and magnesium stearate.
72. The pharmaceutical composition according to any one of the preceding items, wherein the composition comprises or consists of: 10 to 25 wt % GDL; 15 to 30 wt % NaG; 30 to 40 wt % HPMC; 15 to 45 wt % starch; 0.25 to 1.25 wt % silica; and 0.5 to 1.5 wt % magnesium stearate.
73. The pharmaceutical composition according to any one of the preceding items, wherein the composition comprises or consists of: 15 to 25 wt % GDL; 20 to 30 wt % NaG; 30 to 40 wt % HPMC; 15 to 25 wt % starch; 0.25 to 1.25 wt % silica; and 0.5 to 1.5 wt % magnesium stearate.
74. The pharmaceutical composition according to any one of the preceding items, wherein the composition comprises or consists essentially of about: 20 wt % GDL; 24.5 wt % NaG; 35 wt % HPMC; 19 wt % starch; 0.5 wt % silica; and 1 wt % magnesium stearate.
75. The pharmaceutical composition according to item 74, wherein the HPMC is of viscosity type 100.000 mPas.
76. The pharmaceutical composition according to any one of items 74 to 75, wherein the HPMC has a degree of substitution of 2208.
77. The pharmaceutical composition according to any one of the preceding items, wherein the composition comprises or consists essentially of about: 20 wt % GDL; 24.1 wt % NaG; 30 wt % HPMC; 24.4 wt % starch; 0.5 wt % silica; and 1 wt % magnesium stearate.
78. The pharmaceutical composition according to any one of the preceding items, wherein the composition comprises or consists essentially of about: 20 wt % GDL; 24.1 wt % NaG; 35 wt % HPMC; 19.4 wt % starch; 0.5 wt % silica; and 1 wt % magnesium stearate.
79. The pharmaceutical composition according to any one of the preceding items, wherein the composition comprises or consists essentially of about: 20 wt % GDL; 24.5 wt % NaG; 35 wt % HPMC; 19 wt % starch; 0.5 wt % silica; and 1 wt % magnesium stearate.
80. The pharmaceutical composition according to any one of the preceding items, wherein the composition comprises or consists essentially of about: 20 wt % GDL; 24.5 wt % NaG; 35 wt % HPMC; 19.25 wt % starch; 0.5 wt % silica; and 0.75 wt % magnesium stearate.
81. The pharmaceutical composition according to any one of the preceding items, wherein the composition comprises or consists essentially of about: 20 wt % GDL; 24.5 wt % NaG; 35 wt % HPMC; 18.75 wt % starch; 0.5 wt % silica; and 1.25 wt % magnesium stearate.
82. The pharmaceutical composition according to any one of the preceding items 1, wherein the composition comprises or consists essentially of about: 20 wt % GDL; 24.5 wt % NaG; 35 wt % HPMC; 19 wt % starch; 0.5 wt % silica; and 1 wt % magnesium stearate.
83. The pharmaceutical composition according to any one of the preceding items, wherein the composition comprises or consists essentially of about: 10 wt % GDL; 12.25 wt % NaG; 35 wt % HPMC; 41.5 wt % starch; 0.5 wt % silica; and 1.25 wt % magnesium stearate.
84. The pharmaceutical composition according to any one of the preceding items, wherein the composition comprises or consists essentially of about: 10 wt % GDL; 12.25 wt % NaG; 35 wt % HPMC; 41.5 wt % starch; 0.5 wt % silica; and 0.75 wt % magnesium stearate.
85. The pharmaceutical composition according to any one of the preceding items, wherein the composition comprises or consists essentially of about: 15 wt % GDL; 18.375 wt % NaG; 35 wt % HPMC; 30.125 wt % starch; 0.5 wt % silica; and 1 wt % magnesium stearate.
86. The pharmaceutical composition according to any one of the preceding items, wherein the composition comprises or consists of: 15 to 25 wt % GDL; 20 to 30 wt % NaG; 45 to 65 wt % HPMC; 0.25 to 1.25 wt % silica; and 0.5 to 1.5 wt % magnesium stearate.
87. The pharmaceutical composition according to any one of the preceding items, wherein the composition comprises or consists essentially of about: 20 wt % GDL; 24.1 wt % NaG; 54.4 wt % HPMC; 0.5 wt % silica; and 1 wt % magnesium stearate.
88. The pharmaceutical composition according to any one of the preceding items, wherein the composition comprises or consists of: 15 to 25 wt % GDL; 20 to 30 wt % NaG; 25 to 40 wt % HPMC; 10 to 30 wt % MCC; 0.25 to 1.25 wt % silica; and 0.5 to 1.5 wt % magnesium stearate.
89. The pharmaceutical composition according to any one of the preceding items, wherein the composition comprises or consists essentially of about: 20 wt % GDL; 24.1 wt % NaG; 30 wt % HPMC; 24.4 wt % MCC; 0.5 wt % silica; and 1 wt % magnesium stearate.
90. The pharmaceutical composition according to any one of the preceding items, with the proviso that the sum of the components does not exceed 100 wt %.
91. The pharmaceutical composition according to any one of the preceding items, wherein the pharmaceutical composition is stable for at least 6 months in 25° C., or for at least 6 months in 40° C.

92. The pharmaceutical composition according to any one of the preceding items, wherein the composition does not comprise a further anti-fungal agent.
93. The pharmaceutical composition according to item 92, wherein the anti-fungal agent is selected from the group consisting of miconazole, terconazole, isoconazole, fenticonazole, fluconazole, nystatin, ketoconazole, clotrimazole, butoconazole, econazole, tioconazole, itraconazole, 5-fluoracil, and metronidazole.
94. The pharmaceutical composition according to any one of the preceding items for use as a medicament.
95. The pharmaceutical composition according to any one of the preceding items for use in the treatment of microbial infections.
96. The pharmaceutical composition for use according to item 95, wherein the microbial infection is a urogenital infection.
97. The pharmaceutical composition for use according to any one of items 95 to 96, wherein the microbial infection is a vaginal infection.
98. The pharmaceutical composition for use according to any one of items 95 to 97, wherein the microbial infection is selected from the group consisting of fungal infections, bacterial infections and mixed fungal and bacterial infections.
99. The pharmaceutical composition for use according to any one of items 95 to 98, wherein fungal infection is a mycosis.
100. The pharmaceutical composition for use according to item 99, wherein the mycosis is Candidiasis.
101. The pharmaceutical composition for use according to item 100, wherein the Candidiasis is Candidiasis of vulva and vagina or Candidiasis of urogenital sites.
102. The pharmaceutical composition for use according to item 98, wherein the bacterial infection is bacterial vaginosis.
103. The pharmaceutical composition for use according to item 98, wherein the fungal infection is caused by a pathogen selected from the group consisting of *Candida albicans, Candida krusei, Candida glabrata, Candida tropicalis, Trichophyton verrucosum, Trichophyton rubrum, Trichophyton violaceum, Trichophyton tonsurans, Microsporum canis, Malassezia* and *Aspergillus*.
104. The pharmaceutical composition for use according to item 98, wherein the bacterial infection is caused by a pathogen selected from the group consisting of *Gardnerella vaginalis, Chlamydia trachomatis, Neisseria gonorrhoeae, Treponema pallidum* (syphilis), *Atopobium vaginae, Prevotella* spp, *Mobiluncus* spp, *Peptostreptococcus* spp, *Poryphyromonas* spp, *Mycoplasma hominis, Bacteroides* spp, *Ureaplasma urealyticum, Streptococcus* spp, Enterobacteriaceae, Enterococci, *Staphylococcus* spp, *Propionibacterium, Escherichia coli, Klebsiella, Staphylococcus epidermidis, Staphylococcus aureus, Pseudomonas aeruginosa, Acetinobacter baumanii, Streptococcus pyogenes, Streptococcus agalactiae*, Beta-Hemolytic Streptococci Groups C and G and *Porphyromonas gingivalis*.
105. The pharmaceutical composition for use according to any one of items 95 to 103, wherein the infection is an infection in a mammal.
106. The pharmaceutical composition for use according to any one of items 95 to 104, wherein the mammal is human.
107. The pharmaceutical composition for use according to any one of items 95 to 106, wherein the mammal is a woman.
108. The pharmaceutical composition for use according to any one of items 95 to 107, wherein the woman is pregnant.
109. A method for manufacturing the pharmaceutical composition according to any one of items 1 to 88, the method comprising the steps:
    a. Sieving GDL, gluconate salt, HPMC;
    b. Mixing the sieved components in a.; and
    c. Compressing the powder mixture in b. to tablets.
110. The method according to item 109, the method comprising the steps:
    a. Sieving GDL, gluconate salt, HPMC;
    b. Mixing sieved silica with the sieved components in a.;
    c. Mixing lubricant with a portion of the mixture in b.;
    d. Adding the mixture in c. to the remaining mixture in b. and mixing; and
    e. Compressing the powder mixture in formed 109.b. to tablets.
111. The method according to any one of items 109 to 110, wherein the breaking force for the formed tablets is at least 10 kp.
112. The method according to any one of items 109 to 111, wherein the tablet is bullet shaped with a width in the range of 8 to 12 mm, such as in the range of 9 to 11 mm, such as 10 to 10.5 mm, and a length in the range of 15 to 30 mm, such as 17 to 19 mm or such as 20 to 30 mm, such as in the range of 22 to 27 mm, such as in the range of 24 to 25 mm.
113. The method according to any one of items 109 to 112, wherein the tablet forming step is conducted by compression in a 10.3×24.45 mm punch/die set.
114. A method for treatment of microbial infections, said method comprising administering the pharmaceutical composition according to any one of items 1 to 88 to a subject in need thereof.
115. Use of the pharmaceutical composition according to any one of items 1 to 88 in the manufacture of a medicament for treatment of microbial infections.

EXAMPLES

Example 1: Formulations Based on Extreme Points of Design

Composition of the formulations is provided in Table 1. As the obtainable tablet weight was unknown the composition is only given as a percentage. Target tablet weight was approx. 0.85 g and tablet weight was to be similar for all batches.

TABLE 1

Formulations based on the extreme points of the design. The batch sizes were 20-100 g.

| Component (%) | Component, abbreviation | Formulation | | | | |
|---|---|---|---|---|---|---|
| | | D | E | F | G | H |
| Gluconolactone | GDL | 20.0 | 20.0 | 20.0 | 20.0 | 20.0 |
| Sodium gluconate | NaG | — | 24.1 | — | 24.1 | 24.1 |
| Hypromellose (Methocel K100) | HPMC | 20.0 | — | 20.0 | — | — |

TABLE 1-continued

Formulations based on the extreme points of the design. The batch sizes were 20-100 g.

| Component (%) | Component, abbreviation | Formulation | | | | |
|---|---|---|---|---|---|---|
| | | D | E | F | G | H |
| Hypromellose (Methocel K4M) | HPMC | — | 30.0 | — | 30.0 | — |
| Hypromellose (Methocel K200M) | HPMC | — | — | — | — | 30.0 |
| Lactose | Lact | 58.5 | — | — | — | — |
| Cellulose, microcrystalline (MCC PH-102) | MCC | — | 24.4 | — | — | — |
| Cellulose, microcrystalline (MCC PH-200) | MCC | — | — | 58.5 | 24.4 | 24.4 |
| Aerosil 200 | silica | 0.5 | 0.5 | 0.5 | 0.5 | 0.5 |
| Magnesium stearate | MgSt | 1.0 | 1.0 | 1.0 | 1.0 | 1.0 |
| Sum | | 100.0 | 100.0 | 100.0 | 100.0 | 100.0 |
| Batch size, g | | 100 | 20 | 20 | 50 | 60 |

Mixing was performed in Turbula T2F (tumbling mixer) in glass vessels of suitable volume. First, GDL, NaG, HPMC, Lact and MCC were sieved through 1.00 mm screen prior to mixing. Afterwards, silica was premixed with a similar volume of HPMC by shaking in a plastic bag and sieving through 1.00 mm screen and added to the other powders except for MgSt in the mixer vessel. Mixing was performed for 8 min at 32 rpm. Lubricant (MgSt) was premixed with a similar volume of the 8-min-powder-mixture and sieved through 1.00 mm, added to the rest of the 8-min-powder-mixture and mixed for 2 min at 22 rpm. Formulation D was an exception, which was mixed in a mortar with pestle.

The powder mixtures were compressed to tablets in a rotary tablet press (Fette 52i) 9×17 mm punch/die with the same fill volume. As the density of the formulations differed a weight of 0.75-0.97 g was obtained at compression forces of 12-13 kN (corresponding to approx. 100-110 MPa).

The dissolution data are summarized in Table 2. Dissolution testing was performed at 50 rpm in 500 mL 50 mM acetate buffer (pH 4.0) at 37° C. with the paddle apparatus (Apparatus 2, Ph.Eur.). The content of GDL and NaG was determined by HPLC and expressed as GDL. Normalization was performed, i.e. assuming 100% dissolved after 24 or 48 h (when the level was reached) and calculation of per cent dissolved at preceding time points based on the actual 24 h- or 48 h-value.

TABLE 2

Dissolution data, normalized 48 h.

| Formulation | 2 h | 4 h | 6 h | 8 h | 24 h | 48 h |
|---|---|---|---|---|---|---|
| D | 53 | 72 | 85 | 92 | 95 | 100 |
| G | 33 | 53 | 66 | 77 | 98 | 100 |
| F | 53 | 71 | 81 | 88 | 98 | 100 |
| H | 34 | 52 | 64 | 75 | 97 | 100 |

Dissolution testing indicated that the dissolution from formulation 0 and formulation F with 20% GDL and 20% HPMC of low viscosity was rapid compared to formulations G and H (with 20% GDL and 24.1% NaG, 30% HPMC K4M or K200M, and MOO as filler). It is to be observed that formulation 0 contained a watersoluble filler (Lact) and formulation F a water insoluble filler. Formulations G and H with large differences in viscosity of HPMC resulted in similar dissolution profiles.

As high viscosity of HPMC generally reduces the dissolution rate for solid oral dosage forms, the high viscosity type of HPMC was selected for further formulation studies aiming for a release time in vivo of about 48 hours. Formulation H was a prototype for Example 2.

Example 2: Formulations Based on Different Proportions of HPMC and Starch

The batch size was 500 g for the formulations in Table 3, based on formulation H.

TABLE 3

Complete composition of three formulations based on different proportions of Hypromellose and starch, in g or % (within parenthesis).

| Component | Component, abbreviation | Formulation | | | |
|---|---|---|---|---|---|
| | | H | I | J | K |
| Glucono-δ-lactone | GDL | (20.0%) | 100 (20.0%) | 100 (20.0%) | 100 (20.0%) |
| Sodium gluconate | NaG | (24.1%) | 120.5 (24.1%) | 120.5 (24.1%) | 120.5 (24.1%) |
| Hypromellose (Methocel K200M) | HPMC | (30.0%) | 150 (30.0%) | 175 (35.0%) | 272 (54.4%) |
| Cellulose, microcrystalline (Avicel PH 200) | MCC | (24.4%) | — | — | — |
| Starch, pregel. | starch | — | 122 (24.4%) | 97 (19.4%) | — |
| Silica, colloidal anhydrous (Aerosil 200) | silica | (0.5%) | 2.5 (0.5%) | 2.5 (0.5%) | 2.5 (0.5%) |
| Magnesium Stearate | MgSt | (1.0%) | 5 (1.0%) | 5 (1.0%) | 5 (1.0%) |
| Sum | | (100%) | 500 (100.0%) | 500 (100.0%) | 500 (100.0%) |

Mixing was performed in Turbula T2F 2 L glass vessel. First, GDL, NaG, HPMC and starch were sieved through 1.00 mm screen prior to mixing. Afterwards, silica was premixed with a similar volume of HPMC by shaking in a plastic bag and sieving through 1.00 mm screen and added to the other four powders in the mixer vessel. Mixing was performed for 8 min at 32 rpm. Lubricant (MgSt) was premixed with a similar volume of the 8-min-powder-mixture and sieved through 1.00 mm, added to the rest of the 8-min-powder-mixture and mixed for 2 min at 22 rpm. The powder mixture was compressed to tablets in Fette 52i, 2 sets of punch/die 9×17 mm. Tablet weight was to be similar for the batches, approx. 0.85 g.

Technical properties of the tablets are displayed in Table 4. The friability was tested in accordance with The European Pharmacopoeia 2.9.7. *Friability of uncoated tablets*. Mean weight was influenced by the bulk density of the formulation but the technical properties as for tablets compressed at actual compression forces were acceptable.

TABLE 4

Technical properties of tablets at actual compression forces.

| Test | I | J | K |
|---|---|---|---|
| Main compression force, kN | 14-16 | 12-14 | 9-11 |
| Tabl. mean weight, g | 0.93 | 0.89 | 0.76 |
| Breaking force, kp | 8.2-8.8 | 5.2-8.1 | 8.1-9.6 |
| Friability, % | 0.40 | 0.46 | 0.03 |

The dissolution data are summarized in Table 5. Dissolution testing was performed in the same way as for Example 1.

TABLE 5

Dissolution data, normalized 24 h.

| Formulation | 2 h | 4 h | 6 h | 8 h | 24 h |
|---|---|---|---|---|---|
| I | 31 | 48 | 60 | 71 | 100 |
| J | 31 | 48 | 61 | 71 | 100 |
| K | 32 | 51 | 64 | 75 | 100 |

Formulation I, which is based on formulation H (Table 3) but with MCC replaced by starch, exhibited a slight reduction of the dissolution rate compared to formulation K (without any starch), Table 5. Formulation K exhibited a poorer flow than the other two formulations.

Example 3: Formulations Based on the Influence of Low Viscosity HPMC

The influence of low viscosity HPMC in the formulation was studied in two formulations. Batch size was 600 g powder mixture.

TABLE 6

Formulations in g and per cent (within parenthesis).

| Component | Component, abbreviation | Formulation L | Formulation M |
|---|---|---|---|
| Glucono-δ-lactone, powder F2500 | GDL | 120.0 (20.0) | 120.0 (20.0) |
| Sodium gluconate | NaG | 147.0 (24.5) | 147.0 (24.5) |
| Hypromellose, Pharmacoat 615 | HPMC | 210.0 (35.0) | — |
| Hypromellose, Methocel K100 | HPMC | — | 210.0 (35.0) |
| Starch 1500 | starch | 114.0 (19.0) | 114.0 (19.0) |
| Aerosil | silica | 3.0 (0.5) | 3.0 (0.5) |
| Magnesium stearate | MgSt | 6.0 (1.0) | 6.0 (1.0) |
| Sum | | 600.0 (100.0) | 600.0 (100.0) |

Mixing was performed in Turbula T2F 2 L glass vessel. First, GDL, NaG, HPMC and starch were sieved through 1.00 mm screen prior to mixing. Afterwards, silica was premixed with a similar volume of HPMC by shaking in a plastic bag and sieving through 1.00 mm screen and added to the other four powders in the mixer vessel. Mixing was performed for 8 min at 32 rpm.

Lubricant (MgSt) was premixed with a similar volume of the 8-min-powder-mixture and sieved through 1.00 mm, added to the rest of the 8-min-powder-mixture and mixed for 2 min at 22 rpm.

The powder mixture was compressed to tablets in Fette 52i, 2 sets of punch/die 9×17 mm. Tablet weight was to be similar for both batches, approx. 0.85 g. Set value for main compression force was 18 kN.

Dissolution testing was conducted in the same way as for Example 1. The technical properties were determined as described in Example 2.

TABLE 7

Normalized dissolution data.

| Formulation | Compr force (kN) | Dissolution (%) | | | | |
|---|---|---|---|---|---|---|
| | | 2 h | 4 h | 6 h | 8 h | 24 h |
| L | 32 | 45 | 74 | 96 | 99 | 100 |
| M | 19 | 39 | 60 | 77 | 91 | 100 |
| J | 12-14 | 31 | 48 | 61 | 72 | 100 |

TABLE 8

Technical properties.

| Formulation | Compr force, kN | Breaking force, kp | Friability, % |
|---|---|---|---|
| L | 32 | Approx. 8 | 0.44 |
| M | 19 | Approx. 13 | 0.25 |

Formulation L (HPMC of type 15 mPas viscosity) had to be compressed at a very high pressure (32 kN) to obtain tablets of acceptable technical properties (breaking force and friability) but the dissolution was rapid, Table 7. The dissolution of Formulation M (HPMC of type 100 mPas) was slower than Formulation L but faster than formulation J with HPMC of type 200 000 mPas. The technical properties (breaking force and friability) of Formulation M were acceptable, Table 8. So, if a low viscosity type of HPMC were to be included in the formulation the type K100 would be selected.

Example 4: Formulations Based on the Influence of Drug Substance Concentration

The influence of drug substance concentration (i.e. the sum of GDL and NaG), proportion of low to high viscosity HPMC, the concentration pregelatinized starch, and the lubricant concentration on the vaginal tablet was studied in a fractional factorial design. Used formulations are displayed in Table 9. Hypromellose of type K100 (100 mPas) and K100M (100 000 mPas) was employed. High viscosity HPMC K200M (200 000 mPas) was changed to K100M. The batch size was 500 g.

TABLE 9

Composition of formulations N-T (%).

| Component (%) | Component, abbreviation | Formulation | | | | |
|---|---|---|---|---|---|---|
| | | N | O | P | Q | R, S, T |
| Glucocono-delta-lactone, powder F2500 | GDL | 10.0 | 10.0 | 20.0 | 20.0 | 15.0 |

TABLE 9-continued

Composition of formulations N-T (%).

| Component (%) | Component, abbreviation | Formulation | | | | |
|---|---|---|---|---|---|---|
| | | N | O | P | Q | R, S, T |
| Sodium gluconate | NaG | 12.25 | 12.25 | 24.5 | 24.5 | 18.375 |
| Hypromellose, K100 | HPMC | 0 | 17.5 | 0 | 17.5 | 8.75 |
| Hypromellose, K100M | HPMC | 35.0 | 17.5 | 35.0 | 17.5 | 26.25 |
| Starch 1500 | starch | 41.5 | 41.5 | 19.25 | 18.75 | 30.125 |
| Aerosil | silica | 0.5 | 0.5 | 0.5 | 0.5 | 0.5 |
| Magnesium stearate | MgSt | 1.25 | 0.75 | 0.75 | 1.25 | 1.0 |

Mixing was performed in a similar way as for Example 3. Tablets were compressed in the rotary press with 9×17 mm oval punches at a pressure of 18 kN (corresponding to approx. 150 MPa) with an intended weight of about 0.8 g.

Tablets with acceptable technical properties—breaking force 8.2-12.2 kp, friability 0.28-0.44%, uniformity of dosage units expressed as RSD 0.8-1.8%—were obtained for all formulations.

The same procedure for dissolution testing as in Example 1 was used but the content of GDL and NaG was determined by UPLC and expressed as GDL.

The dissolution results were similar although formulation N with low level of drug substance, high level of high viscosity HPMC, high level of starch and high level of lubricant was somewhat slower as expected, Table 10.

TABLE 10

Normalized dissolution results 2-24 h.

| Formulation | 2 h | 4 h | 6 h | 8 h | 10 h | 12 h | 24 h |
|---|---|---|---|---|---|---|---|
| N | 35 | 49 | 60 | 68 | 75 | 81 | 100 |
| O | 36 | 51 | — | 73 | 80 | — | 100 |
| P | 35 | 50 | 64 | 75 | 83 | — | 100 |
| Q | 36 | 53 | 67 | 78 | 87 | 93 | 100 |
| R | 36 | 49 | 61 | 74 | 82 | — | 100 |
| S | 34 | 50 | 62 | 74 | 83 | 88 | 100 |
| T | 35 | 49 | 61 | 74 | 80 | — | 100 |

Considering dissolution profile and technical properties, formulation P was selected for refinement. A modification of lubricant and starch concentrations, slight ones, of formulation P was selected as the formulation C, Table 11.

Example 5: Influence from Compression Force on Dissolution Rate

Formulation C was produced on a batch size of 700 g. Otherwise mixing was similar to the batches of the design. Tablet compression was performed at 18-24 kN.

TABLE 11

Composition, %.

| Component | Component, abbreviation | Formulation P | Formulation C |
|---|---|---|---|
| Glucono-δ-lactone, powder F2500 | GDL | 20.0 | 20.0 |
| Sodium gluconate | NaG | 24.5 | 24.5 |
| Hypromellose, Methocel K200M | HPMC | 35.0 | — |
| Hypromellose, Benecel K100M Pharma XR | HPMC | — | 35.0 |
| Starch 1500 | star | 19.25 | 19.0 |
| Aerosil | silica | 0.5 | 0.5 |
| Magnesium stearate | MgSt | 0.75 | 1.0 |
| Sum | — | 100.00 | 100.0 |

The technical properties of tablets are mainly influenced by the compression force which was fixed to 18 kN in the fractional factorial design. The influence of compression force was separately tested for formulations P and C.

The influence from compression force on dissolution rate was tested for formulations C and P. The dissolution testing was conducted in the same way as described in Example 1.

TABLE 12

Dissolution data, normalized, 2-24 h.

| Formulation | Compr force (kN) | Dissolution (%) | | | | | |
|---|---|---|---|---|---|---|---|
| | | 2 h | 4 h | 6 h | 8 h | 10 h | 24 h |
| C | 18 | 34 | 51 | 64 | 75 | 83 | 100 |
| C | 24 | 35 | 52 | 65 | 76 | 85 | 100 |
| P | 19 | 35 | 50 | 64 | 75 | 83 | 100 |

Data from Table 12 indicate that the dissolution was similar for tablets of formulations C and P compressed at 18-19 kN, and for formulation C compressed at 24 kN. The technical properties of the tablets were acceptable. Thus, the dissolution was not affected by normal compression forces giving acceptable technical tablet properties.

Example 6: A 10.3×24.5 mm Punch/for a Single-Punch Tablet Machine

Tablets with a weight of about 1.5 g was desired which required die/punch set with dimensions that could not be used in the available rotary tablet press. A punch/die set 10.3×24.5 mm was procured for a single-punch tablet machine. This equipment was used for production of tablets to clinical trials and stability studies. At the same time an increase of the batch size to 1.8 kg was made (formulation A). A batch of size 700 g powder mixture of formulation A was manufactured with the 10.3×24.5 mm tooling prior to Formulation A. Dissolution data in Table 13 indicate that the dissolution profiles for 10.3×24.5 mm bullet shaped tablets were similar to 9×17 mm oval tablets.

TABLE 13

Dissolution data, normalized.

| Formulation | Dissolution 2 h, % | Dissolution 4 h, % | Dissolution 6 h, % | Dissolution 8 h, % | Dissolution 24 h, % |
|---|---|---|---|---|---|
| A (700 g batch) | 31 | 46 | 61 | 71 | 100 |
| A (1.8 kg batch) | 33 | 48 | 62 | 72 | 100 |
| P (9 × 17 mm tooling, rotary press) | 35 | 50 | 64 | 75 | 100 |

Example 7: Composition for Biocompatibility and Stability Studies

The batch size of formulation A was 1800 g powder mixture. Batch formula and composition are summarized in Table 14.

TABLE 14

Batch formula and composition for formulation A (biocompatibility and stability study).

| Component | Component, abbreviation | Amount in batch (g) | Composition (%) | Amount in tablet (mg) |
|---|---|---|---|---|
| Glucocono-δ-lactone | GDL | 360 | 20.0 | 300.0 |
| Sodium gluconate | NaG | 441 | 24.5 | 367.5 |
| Hypromellose (viscosity type 100.000 mPas, degree of substitution 2208) Metolose 90SH-100.000SR | HPMC | 630 | 35.0 | 525.0 |
| Starch, pregelatinized Starch 1500 | starch | 342 | 19.0 | 285 |

TABLE 14-continued

Batch formula and composition for formulation A (biocompatibility and stability study).

| Component | Component, abbreviation | Amount in batch (g) | Composition (%) | Amount in tablet (mg) |
|---|---|---|---|---|
| Silica, colloidal anhydrous Aerosil 200 | silica | 9 | 0.5 | 7.5 |
| Magnesium stearate | MgSt | 18 | 1.0 | 15.0 |
| Total | — | 1800 | 100.0 | 1500.0 |

Mixing was performed in Turbula T10B (tumbling mixer), 6 L vessel of stainless steel. GDL, NaG, HPMC and starch were sieved through 1.00 mm screen. Silica was premixed in a similar volume of HPMC by shaking in a plastic bag and sieving through 1.00 mm screen and then added to the other four powders in the mixer vessel. Mixing was performed for 8 min at 32 rpm. MgSt was premixed with a similar volume of the 8-min-powder-mixture and sieved through 1.00 mm, added to the rest of the 8-min-powder-mixture and mixed for 2 min at 23 rpm.

The powder mixture was compressed to bullet shaped 10.3×24.5 mm tablets in Korsch EK-0 (single-punch tablet press). Tablets weighing 1.5 g of acceptable friability (0.3%) and breaking force (17-18 kp) were obtained.

Dissolution testing was performed in the same way as for Example 2. The dissolution results are presented in Table 15.

TABLE 15

Dissolution data normalized, per cent dissolved.

| Batch/formulation | 2 h | 4 h | 6 h | 8 h | 24 h |
|---|---|---|---|---|---|
| A | 33 | 48 | 62 | 72 | 100 |
| B (example 7) | 31 | 46 | 61 | 72 | 100 |
| C (example 6, 18 kN, rotary press) | 34 | 51 | 64 | 75 | 100 |

This example demonstrates preparation of a tablet comprising GDL, NaG and HPMC which is stable and biocompatible.

Example 8: Formulations Based on Different Fillers

The influence of HPMC viscosity, and the type of filler was studied in a fractional factorial design. Used formulations are displayed in Table 16.

TABLE 16

Composition in percent.

| Component | Component, abbreviation | Formulation U | Formulation V | Formulation W | Formulation X | Formulation Y |
|---|---|---|---|---|---|---|
| Glucocono-δ-lactone | GDL | 15.0 | 15.0 | 15.0 | 15.0 | 15.0 |
| Sodium gluconate | NaG | 18.4 | 18.4 | 18.4 | 18.4 | 18.4 |
| Hypromellose (100 mPas) | HPMC | 20.0 | 10.0 | 20.0 | — | — |
| Hypromellose (4000 mPas) | HPMC | — | — | — | 35.0 | 35.0 |
| Starch, pregelatinized | starch | 14.25 | 14.25 | 14.25 | 14.25 | 14.25 |
| Cellulose, microcrystalline | MCC | 31.25 | 41.25 | — | 16.25 | — |
| Mannitol, Pearlitol 100 SD | Mannitol | — | — | 31.25 | — | 16.25 |

TABLE 16-continued

| | | Composition in percent. | | | | |
|---|---|---|---|---|---|---|
| Component | Component, abbreviation | Formulation U | Formulation V | Formulation W | Formulation X | Formulation Y |
| Silica, colloidal anhydrous | silica | 0.38 | 0.38 | 0.38 | 0.38 | 0.38 |
| Magnesium stearate | MgSt | 0.75 | 0.75 | 0.75 | 0.75 | 0.75 |
| Total | | 100.03 | 100.03 | 100.03 | 100.03 | 100.03 |

Technical properties of the tablets are displayed in Table 17. The friability was tested in accordance with The European Pharmacopoeia 2.9.7. *Friability of uncoated tablets*.

TABLE 17

Technical properties.

| Formulation | Breaking force (kp) | Friability (%) | Normalized thickness (mm/g) |
|---|---|---|---|
| U | 16.6 | 0.39 | 6.52 |
| V | 16.8 | 0.24 | 6.36/6.37 |
| W | 15.8 | 0.31 | 6.30 |
| X | 16.4 | 0.24 | 6.65 |
| Y | 15.7 | 0.29 | 6.53 |

Formulations U to Y yielded tablets with appropriate technical properties.

The dissolution data are summarized in Table 18. Dissolution testing was performed in the same way as for Example 1.

TABLE 18

Dissolution data, normalized 24 h.

| Formulation | 1 h | 2 h | 4 h | 6 h | 8 h | 10 h | 24 h |
|---|---|---|---|---|---|---|---|
| U | 33 | 50 | 71 | 89 | 96 | 98 | 100 |
| V | 54 | 70 | 85 | 93 | 97 | 98 | 100 |
| W | 28 | 47 | 81 | 97 | 99 | 99 | 100 |
| X | 25 | 38 | 54 | 68 | 81 | 88 | 100 |
| Y | 23 | 35 | 52 | 68 | 81 | 90 | 100 |

The formulations comprising mannitol were less adhesive than the corresponding compositions comprising MCC. Further, it was noticed that MCC had better binding properties than mannitol.

The compositions comprising HPMC 100 mPas were dissolved more rapidly than the corresponding compositions comprising HPMC 4000 mPas.

Out of the tested formulations in Example 8, formulations U and V are most suitable for administration once daily.

Example 9: Formulations Based on Formulations U and V

The influence of HMPC, MOO and lubricant concentrations were studied. Used formulations are displayed in Table 19.

TABLE 19

| | | Composition in percent. | | | | |
|---|---|---|---|---|---|---|
| Component | Comp., abbr. | Formulation Z1 | Formulation Z2 | Formulation Z3 | Formulation Z4 | Formulation Z5 |
| Glucocono-δ-lactone | GDL | 15.0 | 15.0 | 15.0 | 15.0 | 15.0 |
| Sodium gluconate | NaG | 18.4 | 18.4 | 18.4 | 18.4 | 18.4 |
| Hypromellose (100 mPas) | HPMC | 10.0 | 20.0 | 10.0 | 20.0 | 15.0 |
| Starch, pregelatinized | starch | 14.25 | 14.25 | 14.25 | 14.25 | 14.25 |
| Cellulose, microcrystalline | MCC | 41.25 | 31.25 | 40.75 | 30.75 | 36.0 |
| Silica, colloidal anhydrous | silica | 0.38 | 0.38 | 0.38 | 0.38 | 0.38 |
| Magnesium stearate | MgSt | 0.75 | 0.75 | 1.25 | 1.25 | 1.0 |
| Total | | 100.03 | 100.03 | 100.03 | 100.03 | 100.03 |

Technical properties of the tablets are displayed in Table 20. The friability was tested in accordance with The European Pharmacopoeia 2.9.7. *Friability of uncoated tablets*.

TABLE 20

Technical properties.

| Formulation | Breaking force (kp) | Friability (%) | Normalized thickness (mm/g) |
|---|---|---|---|
| Z1 | 21.3 | 0.3 | 5.68 |
| Z2 | 21.3 | 0.23 | 5.78 |
| Z3 | 22.1 | 0.23 | 5.56 |
| Z4 | 21.6 | 0.2 | 5.7 |
| Z5 | 20.8-21.7 | 0.19-0.23 | 5.66-5.71 |

Formulations U to Y yielded tablets with appropriate technical properties.

The dissolution data are summarized in Table 21. Dissolution testing was performed in the same way as for Example 1.

TABLE 21

Dissolution data, normalized 24 h.

| Formulation | 1 h | 2 h | 4 h | 6 h | 8 h | 24 h |
|---|---|---|---|---|---|---|
| Z1 | 38 | 55 | 78 | 92 | 95 | 100 |
| Z2 | 26 | 38 | 60 | 89 | 89 | 100 |
| Z3 | 33 | 47 | 69 | 83 | 92 | 100 |
| Z4 | 30 | 39 | 59 | 81 | 90 | 100 |
| Z5 | 28-29 | 41-42 | 62-65 | 80-84 | 90-92 | 100 |

Example 10: A Fluid Model for Dissolution of Vaginal Tablets of Formulation A

Figure 2:
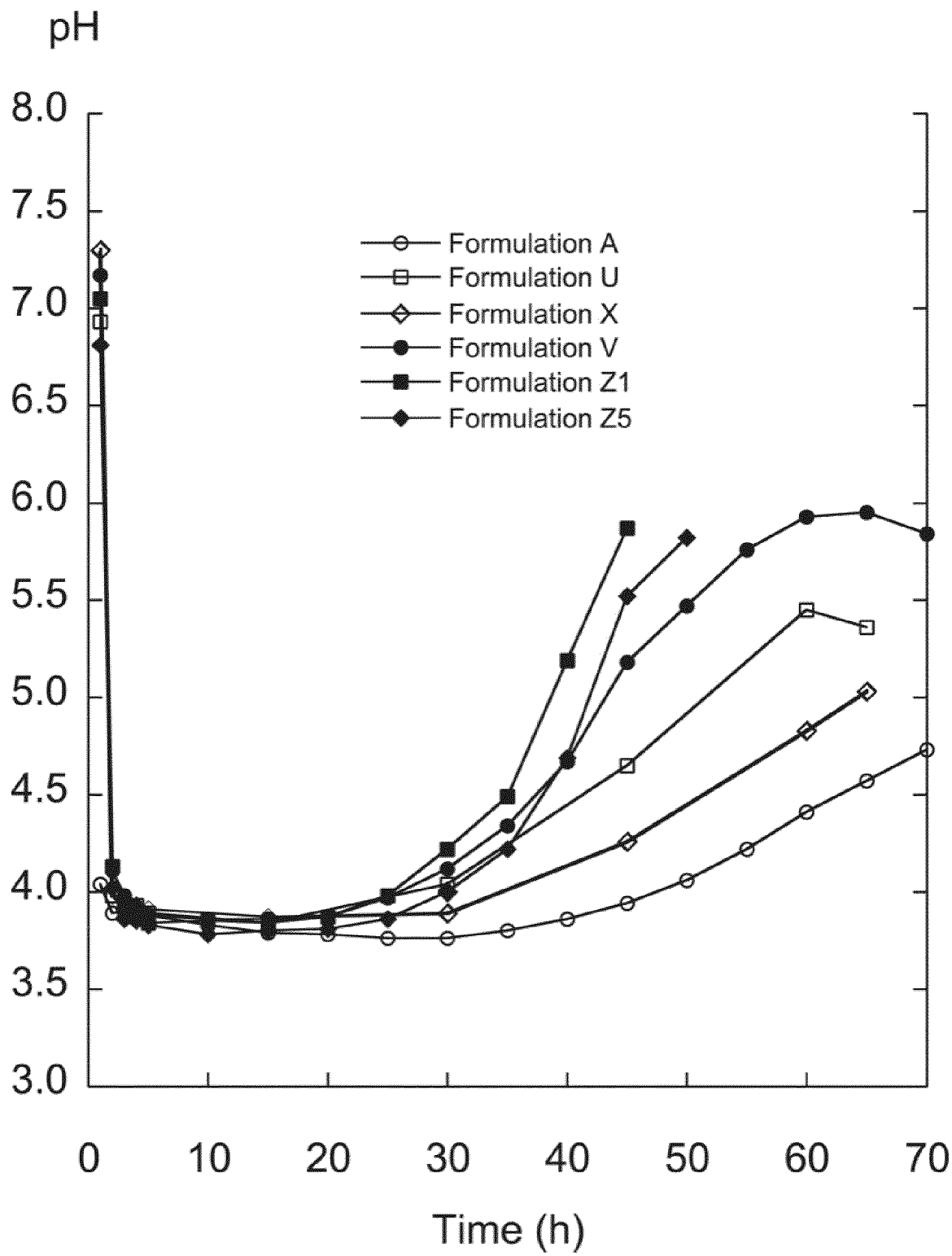
FIG. 2. Results from measurements using the vaginal fluid model (depicted in FIG. 1) as described in Example 10. Empty circles: Formulation A; empty squares: Formulation U; empty diamonds: Formulation X; filled circles: Formulation V; filled squares: Formulation Z1; and filled diamonds: Formulation Z5.

The vaginal fluidic model (FIG. 1) consists of a reservoir with distilled water (approx. 1 L), a peristaltic pump, a glass column (i.d. 30 mm, h. 130 mm) and a fraction collector. The water is pumped into the glass column at a rate of 0.1 mL per minute under normal pressure. The estimated volume of cervicovaginal secretions is 0.51 mL [Mitchell, C.; Paul, K.; Agnew, K.; Gaussman, R.; Coombs, R. W.; Hitti, J. *Journal of clinical microbiology* 2011, 49, 735]. The vaginal tablet is wrapped in an artificial sponge (Wettex®, made from regenerated cellulose, h. 50 mm) to simulate the vaginal mucous membrane. The glass column is heated by an infrared heater (220V, 60 W) at a distance of 60 mm to give a core temperature of 35° C. The fluid is collected using a fraction collector set at 60 min per fraction. Vaginal tablets of formulations A, U, X, V, Z1 and Z5 were tested in independent experiments (FIG. 2). The pH of each fraction was measured by a pH-electrode. The results show that the active substances are released to give efficient doses, as indicated by a lowered pH.

Example 11: Stability Test

Formulation A tablets were packaged into blister material consisting of Teknilid® 1250 as lidding foil (Aluminium) and Tekniflex® VPOA 10300 (PVC/EVOH/ACLAR). The stability of Formulation A in the blisters were evaluated in a technical stability study in the conditions 25° C./60% RH and 40° C./75% RH. The stability of the formulation was followed for 1, 3, 6 and 12 months, see table 22 and 23. Three batches of Formulation A tablets were also produced under GMP conditions and stability was confirmed for all three batches for at least 12 months (data not shown).

TABLE 22

Assay (% of expected content)

| Time point | 25° C./60% RH | 40° C./75% RH |
|---|---|---|
| Initial | 98.1 | 98.1 |
| 1 month | 99.0 | 99.1 |
| 3 months | 99.5 | 98.9 |
| 6 months | 98.6 | 100.6 |
| 12 months | 98.9 | Not tested |

TABLE 23

Weight gain (% of initial).

| Time point | 25° C./60% RH | 40° C./75% RH |
|---|---|---|
| Initial | 100.0 | 100.0 |
| 1 month | 99.9 | 100.4 |
| 3 months | 101.2 | 101.3 |
| 6 months | 100.5 | 102.0 |
| 12 months | 100.5 | Not tested |

For all analyses, Formulation A was found to be within the acceptable range, i.e. 90-110%.

Example 12: Cytotoxicity Test of Formulation A

Glucono-delta-lactone is a normal intermediate in glucose metabolism through the pentose phosphate cycle in mammals. Several studies on humans have been performed using oral doses between 3 g and 50 g of GDL with no signs of toxicity. The investigated studies showed no evidence for carcinogenicity, teratogenicity, or genotoxicity of GDL, or D-gluconic acid or the magnesium, potassium, calcium, or sodium salts thereof. In addition, both the U.S. Food & Drug Administration (FDA) and the World Health Organization International Programme on Chemical Safety (ICPS) accepts GDL as a safe food additive. [International Programme on Chemical Safety (I PCS). *Glucono-Delta-Lactone and the Calcium, Magnesium, Potassium, and Sodium Salts of Gluconic Acid.* 1999; Available from: http://www.inchem.org/documents/iecfa/iecmono/v042ie12.htm; U.S. Food and Drug Administration, 21CFR184.1318]

Cytotoxicity Test

The cytotoxic effects of Formulation A were analysed by incubating the test item in indirect contact for at least 24 hrs with L929 cells overlayed by agarose and stained with neutral red. The decolorization index and the lysis index were determined microscopically, according to the size of the decolorized area and the number of lysed cells around and beneath the test item, respectively. Cell reaction was recorded as decolorization index/lysis index and graded on a scale from 0 to 3.

Prior to the test, the test item was finely crushed. As negative and positive controls, High density polyethylene material and 0.1% Zinc-diethyldithiocarbamate (ZDEC) polyurethane film was used respectively. Each tissue culture dish was treated with two samples of the test item, one negative and one positive control. Three culture dishes were treated in parallel. After the incubation period, the cells around and under the samples were analysed with an inverted microscope.

Results

The results of the cytotoxicity tests are presented in the tables below:

TABLE 24

Decolorization Index.

| Test group | Decolorization Index | | | | | | Median |
|---|---|---|---|---|---|---|---|
| Test Item | 2 | 2 | 2 | 2 | 2 | 2 | 2 |
| Negative Control | 0 | | 0 | | 0 | | 0 |
| Positive Control | 3 | | 3 | | 3 | | 3 |

TABLE 25

Lysis index.

| Test group | Lysis Index | | | | | | Median |
|---|---|---|---|---|---|---|---|
| Test Item | 1 | 1 | 1 | 1 | 1 | 1 | 1 |
| Negative Control | 0 | | 0 | | 0 | | 0 |
| Positive Control | 5 | | 5 | | 5 | | 5 |

TABLE 26

Interpretation of Cytotoxicity.

| Test group | Scale | Cell Reaction | Interpretation of Cytotoxicity |
|---|---|---|---|
| Test Item | 1-2 | 2/1 | Slight to moderate |
| Negative Control | 0 | 0/0 | none |
| Positive Control | 2-3 | 3/5 | Moderate to severe |

Conclusions

The test item (Formulation A) was classified as slight to moderate cytotoxic. The controls confirmed the validity of the study.

Example 13: Sensitisation Test

The Local Lymph Node Assay (LLNA) is a method for the identification of skin sensitising test items and measures proliferation of lymphocytes isolated from lymph nodes (auricular lymph nodes) draining the site of exposure (dorsal aspect of the ears) in mice. Lymphocyte proliferation is measured by determining the incorporation of $^3$H-methyl thymidine. The Formulation A was extracted using two different media: physiological saline 0.9% NaCl (polar extraction media) and acetone/olive oil 4:1 (v/v) (nonpolar extraction media), according to ISO 10993-12. [ISO 10993-12: 2012 "Biological evaluation of medical devices—Part 12: Sample preparation and reference materials"].

Topical application of the extract was performed once daily over three consecutive days and 5 mice were used per test group. Five days after the first topical application treatment all mice were dosed with $^3$H-methyl thymidine intravenously, and 5 hours thereafter sacrificed. The lymph node cells from the draining "auricular lymph nodes" were pooled from each animal (2 lymph nodes per animal). Thereafter the $^3$H-methyl thymidine incorporation was measured and expressed as the number of disintegrations per minute per lymph node (DPM/Node) and as the ratio of $^3$H-methyl thymidine incorporation into lymph node cells of test group animals relative to that recorded for control group animals (Stimulation Index). Background values were subtracted. A substance is regarded as a "sensitiser" in the LLNA if the test item extract results in a 3-fold or greater increase in $^3$H-methyl thymidine incorporation into lymph node cells of the test group animals relative to that recorded for the lymph nodes of the control-group animal (stimulation index equal to or greater than 3.0).

Results

The ratio of $^3$H-methyl thymidine incorporation into lymph node cells of test group animals relative to that recorded for the control group animals (stimulation index) for the polar test item extract was 1.2. The ratio of $^3$H-methyl thymidine incorporation into lymph node cells of test group animals relative to that recorded for the control group animals (stimulation index) for the nonpolar test item extract was 1.3. All animals showed the expected weight development which includes a weight loss of up to 2 g throughout the study. All animals survived throughout the test period without showing any clinical signs. The polar as well as the nonpolar positive-control substance exceeded the stimulation index of 3 confirming the reliability of the test system.

Conclusion

Under the conditions of the present study, Formulation A caused no reactions identified as sensitisation, as the stimulation indices of both the polar and the nonpolar test item extracts were below the stimulation index of 3.

Example 14: Irritation Test

The potential of Formulation A to produce irritation to the vaginal tissue was investigated on albino rabbits. Formulation A was extracted in physiological saline 0.9% NaCl according to ISO 10993-12. [ISO 10993-12: 2012 "Biological evaluation of medical devices—Part 12: Sample preparation and reference materials"]. The supernatant of the test item extract was applied to the animals. The extraction medium was used as control on three animals. The test item extract was applied to three animals by using a flexible plastic blunt-tipped cannula with a syringe which was introduced directly into the vagina. The procedure was repeated at 24±2 hours intervals for five consecutive days.

Clinical Observation

24±2 hours after the initial application and immediately prior to each treatment, the appearance of the vaginal opening and perineum was observed and recorded for signs of discharge (grade 0-3), erythema (graded 0-4) and oedema (graded 0-4). Additionally, the animals were observed for clinical signs of toxicity.

Macroscopic Evaluation

24±2 hours after the last application, the entire vagina dissected, opened longitudinally and examined macroscopically for signs of irritation, injury to the epithelial layer of tissue and necrosis. Erythema and oedema were recorded according to a 0 to 4 grade s scoring system. Thereafter, all parts of the vagina as well as the surrounding tissue were fixed with 4% neutral-buffered formaldehyde for further histopathological examinations.

Histopathological Evaluation

The irritant effects on the tissue were graded according to a 0-4 grading system for epithelium, leukocyte infiltration, vascular congestion and oedema.

The grades for microscopic evaluation for all animals in the test group were added and the sum divided by the number of observations to obtain the test group average. The same procedure was done for the control group. The control group average was subtracted from the test group average to obtain the irritation index, Table 25.

TABLE 27

Irritation Index.

| Average Grade | Description of Responses |
|---|---|
| 0 | None |
| 1 to 4 | Minimal |
| 5 to 8 | Mild |
| 9 to 11 | Moderate |
| 12 to 16 | Severe |

Results

Clinical Observation 24 hours after the initial application and prior to each treatment, the appearance of the vaginal opening and perineum was observed and recorded for signs of discharge, erythema and oedema. None of the animals exhibited excessive discharge, erythema, eschar and/or oedema. No signs of irritation were found. No signs of toxicity were recorded.

Macroscopic Examination

At the macroscopic examination of the perivaginal region no signs of irritation or necrosis were found.

Histopathological Evaluation

After daily intravaginal application of Formulation A (test item) or extraction medium (control item) to New Zealand White rabbits for five consecutive days, there was no indication of noteworthy irritation response in the vagina or perivaginal tissue. The findings were not related to treatment and represented physiological background alteration.

TABLE 28

Individual and Average Scores for Microscopic Findings.

| Group | Control Group | | | Test Group | | |
|---|---|---|---|---|---|---|
| Sample Identification | 1 | 2 | 3 | 4 | 5 | 6 |
| Epithelium | 0 | 1 | 0 | 0 | 0 | 0 |
| Leukocyte Infiltration | 0 | 1 | 0 | 0 | 0 | 1 |
| Vascular Congestion | 0 | 0 | 0 | 0 | 2 | 0 |
| Oedema | 0 | 0 | 0 | 0 | 0 | 0 |
| Total Score per Animal | 0 | 2 | 0 | 0 | 2 | 1 |
| Average Score per Group | | 0.67 | | | 1.0 | |
| Irritation Index | | | 0.33 | | | |

Conclusion

Under the conditions of this experiment, the Irritation Index was 0.33. The in vivo irritation showed no signs of irritation or necrosis were observed in the macroscopic assessment. Also, in the histopathology assessment, there were no indicators for irritation of the vaginal mucosa. Thus, it can be concluded that the test item Formulation A showed no irritant effects to the vaginal mucosa. There were no local test item-related findings at histopathological evaluation.

Example 15: Clinical Performance in Treating Bacterial Vaginosis

The clinical performance, tolerability and safety of Formulation A in treating bacterial vaginosis in human patients were investigated in an open-label study. Patients with confirmed bacterial vaginosis diagnosis, defined as having at least three out of four of the following criteria:
1. Thin, white, yellow, homogenous discharge
2. Clue cells on microscopy (more than 20 percent of epithelial cells)
3. pH of vaginal fluid above 4.5
4. Release of fishy odor, "i.e. a positive whiff test" when alkali (10% potassium hydroxide [KOH] solution) is added.

On day 0, patients with confirmed bacterial vaginosis diagnosis were included in the study. The patients self-administered the Formulation A with 2 days apart (Days 0, 2, 4 and 6) and are examined for clinical cure rate at Day 7, defined as absence of all of criteria's 1, 2 and 4 above. Number and disposition of patients is shown in Table 29.

TABLE 29

Number of patients (planned and analysed).

| | Total |
|---|---|
| Planned: | 24 |
| Screened: | 28 |
| Enrolled and treated: | 24 |
| Males/females: | 0/24 |
| Mean age | 33.1 years |
| (range): | (18 to 49 years) |
| Analysed for efficacy: | |
| FAS: | 24 |
| PPAS Clinical cure: | 22 |
| PPAS Recurrence: | 13 |
| Analysed for safety: | 24 |

TABLE 30

Statistical analysis of Clinical cure rate at Day 7.
PPAS Clinical cure.

| Day 7 | Total (N = 22) |
|---|---|
| Number of patients included in analysis | 22 |
| Number of patients clinically cured | 18 |
| Clinical cure rate (one-sided 95% CI) | 81.8% (63.1%, —) |

CI = Confidence interval.
Results are based on the exact binomial distribution (Clopper-Pearson).

TABLE 31

Statistical analysis of recurrence rate on Day 14 and Day 35.
Full analysis set.

| | Total (N = 18) |
|---|---|
| Day 14 | |
| Number of patients included in analysis[a] | 18 |
| Number of patients with Recurrence[b] | 1 |
| Recurrence rate (two-sided 95% CI) | 5.6% (0.1%, 27.3%) |
| Day 35 | |
| Number of patients included in analysis[a] | 16 |
| Number of patients with Recurrence[b] | 0 |
| Recurrence rate (two-sided 95% CI) | 0 (0.0%, 20.6%) |

[a]Clinically cured on Day 7.
[b]Recurrence is defined as responding 'yes' to a yes/no question from the patient questionnaire on whether the symptom have recurred.
Up to Day 35, 1 of the 18 patients (5.6%) experienced Recurrence.
CI = Confidence interval.

Summary of Efficacy Results

Primary clinical performance endpoint (FAS):

The clinical cure rate for Formulation A, defined as absence of all of the 3 Amsel criteria, was 81.8% (one-sided 95% Cl: 63.1%-) on Day 7, i.e. the primary performance objective of the study was fulfilled, see Table 30.

Secondary clinical performance endpoints (FAS):
A proportion of 85.7% was negative for Amsel criterion 1 (thin, white, yellow, homogenous discharge), 90.0% for Amsel criterion 2 (clue cells on microscopy [more than 20% of epithelial cells]) and 86.4% for Amsel criterion 3 (release of fishy odour "i.e. a positive whiff test" when alkali [10% KOH solution] is added), at Day 7 compared to Day 0.

A proportion of 69.6% had a reduction in the sum of the 3 BV symptoms (fishy smell, burning, and irritation) at Day 4 compared to Day 0. At Day 7 the proportion was 77.3%.

The analysis of usability, as measured in patient questionnaire Day 7, showed that 87.5% of the patients agreed that the vaginal tablet was easy to use, 75.0% found the use of the vaginal tablet to be gentle, 79.2% agreed that the treatment was odour free, and 62.5% of the patients thought that the treatment was smear-free and dripless. Furthermore, response to the question "How do you generally regard the treatment?" showed results in the upper range of the scale (median: 8.0; mean: 7.1; on a scale ranging from 1 ["Not satisfied" ] to 10 ["Very satisfied" ]).

The recurrence rate was 5.6% at Day 14, i.e. 1 of the 18 patients that were clinically cured on Day 7 reported recurrence of the symptoms on Day 14. No additional patient reported any recurrence up to Day 35 which means the recurrence rate at Day 35 was the same, 5.6%, see Table 31.

Summary of Safety Evaluation
Extent of Exposure

In total, 24 patients (100%) received study treatment in the study. Based on information given by the patient when asked about the administration, more than 95% of patients stated that they had administered the product on all planned timepoints (Days 0, 2, 4 and 6) in the study.

At baseline (Day 0), the mean (SD) pH was 5.32 (0.50) and at Day 7 the mean (SD) pH was 4.84 (1.03). The lower vaginal pH at the follow-up assessment is an indication of appropriate release.

Summary of Adverse Events

In total, 34 AEs were reported by 18 patients (75%) in the study. There were no deaths or SAEs in the study.

The most common AEs (preferred terms) were Headache (13 events in 10 patients, 41.7%) and Dysmenorrhoea (3 events in 3 patients, 12.5%).

Of the 34 AEs that occurred in the study, 6 AEs were judged as related or possibly related to the study procedure and 5 AEs were judged as related or possibly related to the investigational device.

Most AEs were of mild to moderate intensity. There were 2 severe AEs in 2 patients (8.3%); Pyrexia and Peritonsillar abscess.

Overall Conclusions

The primary objective of the study was fulfilled, and the study provided thus evidence of both clinical performance and good safety/tolerability profile of Formulation A.

The clinical cure rate was high, and there were no safety concerns identified, Formulation A was well tolerated with very few reported AEs assessed as possibly related to the investigational device/Formulation A or to the study procedure. No SAEs or device deficiencies were reported during the study.

Example 16: Clinical Performance in Treating Vaginal Candidiasis

The clinical performance, tolerability and safety of Formulation A in treating vaginal candidiasis in human patients are investigated in an open-label study. Patients with vaginal candidiasis have a white or creamy vaginal discharge plus the following findings:

At least two of the following signs and symptoms of VVC that are characterized as at least moderate: itching, burning, irritation, edema, redness, or excoriation.

Potassium hydroxide (KOH) or saline preparation from the inflamed vaginal mucosa or secretions revealing yeast forms (hyphae or pseudohyphae) or budding yeasts.

On day 0, patients with confirmed vaginal candidiasis are included in the study. The patients self-administer the Formulation A with 2 days apart (Days 0, 2, 4 and 6) and are examined for clinical cure rate at Day 7, defined as the absence of signs and symptoms of VVC in terms of having a composite vulvovaginal signs-and-symptoms (CVVS) score equal to or below 3.

Each of the following six vulvovaginal signs and symptoms is individually scored using the scoring scale below and then added together to determine the CVVS score.

Vulvovaginal signs: erythema, edema, or excoriation
Vulvovaginal symptoms: itching, burning, or irritation
Scoring Scale: each score should be objectively defined.
0=none (absent); 1=mild (slight); 2=moderate (definitely present); 3=severe (marked, intense)

The invention claimed is:

1. A solid pharmaceutical composition suitable for vaginal administration, wherein the pharmaceutical composition consists of
a. 10 wt % to 25 wt % Glucono-δ-lactone (GDL);
b. 10 wt % to 40 wt % Hypromellose (HPMC);
c. 10 wt % to 30 wt % sodium gluconate (NaG);
d. 10 wt % to 45 wt % microcrystalline cellulose (MCC),
e. 10 wt % to 20 wt % starch;
f. 025 wt % to 1.25 wt % silica, and
g. 0.5 wt % to 1.5 wt % magnesium stearate;
and wherein the HPMC has a viscosity in the range of 50 mPas to 200 mPas in a 2% (w/w) aqueous solution, with the proviso that the sum of the components does not exceed 100 wt %.

2. The pharmaceutical composition according to claim 1, wherein the pharmaceutical composition is a tablet.

3. The pharmaceutical composition according to claim 1, wherein no more than 65% of the GDL in the pharmaceutical composition dissolves within six hours using United States Pharmacopeia (USP) Dissolution Apparatus 2-Paddle method, at 50 rpm in 500 mL 50 mM acetate buffer (pH 4.0) at 37° C.

4. The pharmaceutical composition according to claim 1, wherein the amount of GDL is 50 mg to 500 mg.

5. The pharmaceutical composition according to claim 1, wherein the molar ratio of GDL and gluconate salt is 2:1 to 1:2.

6. The pharmaceutical composition according to claim 1, wherein the composition comprises in the range of 10 wt % to 20 wt % HPMC.

7. The pharmaceutical composition according to claim 1, wherein the composition consists of: 15 wt % GDL; 18.4 wt % NaG; 15 wt % HPMC; 36 wt % MCC; 14.25 wt % starch; 0.3 wt % to 0.6 wt % silica; and 0.75 wt % to 1.0 wt % magnesium stearate, with the proviso that the sum of the components does not exceed 100 wt %.

8. A method of treatment of a microbial infection comprising administering the pharmaceutical composition according to claim 1 to a subject in need thereof.

9. The method according to claim 8, wherein the microbial infection is a vaginal microbial infection.

10. The pharmaceutical composition according to claim 1, wherein GDL releases in vivo for at least 18 h.

11. The pharmaceutical composition according to claim 1, wherein GDL releases in vivo for at least 6 h.

12. The pharmaceutical composition according to claim 1, wherein GDL releases in vivo for at least 12 h.

13. The pharmaceutical composition according to claim 1, wherein
- 30 to 50% of the GDL in the pharmaceutical composition dissolves within two hours,
- 40 to 60% of the GDL in the pharmaceutical composition dissolves within four hours,
- 50 to 70% of the GDL in the pharmaceutical composition dissolves within six hours, and
- 60 to 80% of the GDL in the pharmaceutical composition dissolves within eight hours, using United States Pharmacopeia (USP) Dissolution Apparatus 2-Paddle method, at 50 rpm in 500 mL 50 mM acetate buffer (pH 4.0) at 37° C.

14. The pharmaceutical composition according to claim 1, wherein the composition consists of: 15 wt % GDL; 18.4 wt % NaG; 15 wt % HPMC; 35 wt % to 40 wt % MCC; 10 wt % to 20 wt % starch; 0.3 wt % to 0.6 wt % silica; and 0.5 wt % to 1.5 wt % magnesium stearate, with the proviso that the sum of the components does not exceed 100 wt %.

* * * * *